(12) United States Patent
Xu et al.

(10) Patent No.: US 12,542,999 B2
(45) Date of Patent: Feb. 3, 2026

(54) BASS RESPONSE FOR A SPEAKER IN A PORTABLE COMPUTING DEVICE

(71) Applicant: DOLBY LABORATORIES LICENSING CORPORATION, San Francisco, CA (US)

(72) Inventors: Xiaojun Xu, Shenzhen (CN); Tiezhong Liu, Shenzhen (CN)

(73) Assignee: DOLBY LABORATORIES LICENSING CORPORATION, San Francisco, CA (US)

(*) Notice: Subject to any disclaimer, the term of this patent is extended or adjusted under 35 U.S.C. 154(b) by 169 days.

(21) Appl. No.: 18/037,650

(22) PCT Filed: Nov. 17, 2021

(86) PCT No.: PCT/US2021/059656
§ 371 (c)(1),
(2) Date: May 18, 2023

(87) PCT Pub. No.: WO2022/108987
PCT Pub. Date: May 27, 2022

(65) Prior Publication Data
US 2023/0421953 A1  Dec. 28, 2023

Related U.S. Application Data

(60) Provisional application No. 63/134,228, filed on Jan. 6, 2021.

(51) Int. Cl.
H04R 3/04 (2006.01)
(52) U.S. Cl.
CPC ............ *H04R 3/04* (2013.01); *H04R 2499/11* (2013.01)

(58) Field of Classification Search
None
See application file for complete search history.

(56) References Cited

U.S. PATENT DOCUMENTS

| | | |
|---|---|---|
| 5,682,290 A | 10/1997 | Markow |
| 5,805,708 A | 9/1998 | Freadman |

(Continued)

FOREIGN PATENT DOCUMENTS

| | | |
|---|---|---|
| CN | 207589078 U | 7/2018 |
| CN | 110870324 A1 | 3/2020 |

(Continued)

OTHER PUBLICATIONS

English Language Translation of CN207589078U, pp. 1-7. (Year: 2018).*

(Continued)

*Primary Examiner* — Paul W Huber

(57) ABSTRACT

Methods and systems of improving bass response for a speaker in a portable computing device are described. One portable computing device includes first and second cover parts that are joined together to form a casing of the portable computing device, wherein a speaker volume is formed between portions of the first and second cover parts; a speaker arranged within the speaker volume; and one or more elastic spacers arranged between the first and second cover parts. The one or more elastic spacers are arranged to counteract, by their elastic recoil forces, a compression of the speaker volume when the first and second cover parts are under external compressing forces. The one or more elastic spacers are arranged between the first and second cover parts to be partially compressed by the first and second cover parts in the absence of external compressing forces on the first and second cover parts.

14 Claims, 17 Drawing Sheets

(56) References Cited

U.S. PATENT DOCUMENTS

| | | |
|---|---|---|
| 6,304,435 B1 | 10/2001 | Hsu |
| 6,519,139 B2 | 2/2003 | Kambayashi |
| 6,798,654 B2 * | 9/2004 | Chang .................. G06F 1/1688 361/679.23 |
| 6,925,188 B1 | 8/2005 | Markow |
| 7,680,293 B2 | 3/2010 | Lin |
| 7,817,813 B2 | 10/2010 | Kang |
| 7,916,889 B2 | 3/2011 | Takakusaki |
| 8,073,182 B2 | 12/2011 | Li |
| 8,295,534 B2 | 10/2012 | Hamada |
| 8,540,199 B2 * | 9/2013 | Ke ........................ H04R 1/025 248/220.21 |
| 8,660,291 B2 | 2/2014 | Wang |
| 9,555,597 B2 | 1/2017 | Sprenger |
| 9,654,863 B2 * | 5/2017 | Crosby ................ H04R 1/2811 |
| 9,843,659 B2 * | 12/2017 | Yamaguchi ........... H04M 1/035 |
| 2006/0067557 A1 | 3/2006 | Imamura |
| 2009/0169041 A1 | 7/2009 | Zurek |
| 2009/0288911 A1 | 11/2009 | Chen |
| 2013/0057776 A1 * | 3/2013 | Yamaguchi ........... G06F 1/1601 348/731 |
| 2013/0236045 A1 | 9/2013 | Wan |
| 2014/0294225 A1 | 10/2014 | Ji |
| 2014/0301587 A1 | 10/2014 | Ji |
| 2016/0048163 A1 | 2/2016 | Degner |
| 2020/0274239 A1 * | 8/2020 | Amano ................ H01Q 1/2266 |

FOREIGN PATENT DOCUMENTS

| | | |
|---|---|---|
| EP | 1091277 A1 | 4/2001 |
| JP | 2013055249 A | 3/2013 |
| WO | 1998043464 | 10/1998 |

OTHER PUBLICATIONS

English Language Translation of JP2013055249A, pp. 1-4. (Year: 2013).*

J. Q. Mou, Fukun Lai, I. B. L. See, and W. Z. Lin, "Analysis of Notebook Computer Chassis Design for Hard Disk Drive and Speaker Mounting",Data Storage Institute, 5 Engineering Drive 1, Singapore 117608.

Jong-Oh Sun and Kwang-joon Kim, "Isolation of vibrations due to speakers in audio-visual electronic devices without deteriorating vibration of speaker cone", Journal of Mechanical Science and Technology 26 (3) (2012) 723~730, Manuscript Received May 8, 2011; Revised Oct. 16, 2011; Accepted Oct. 25, 2011, Korea.

* cited by examiner

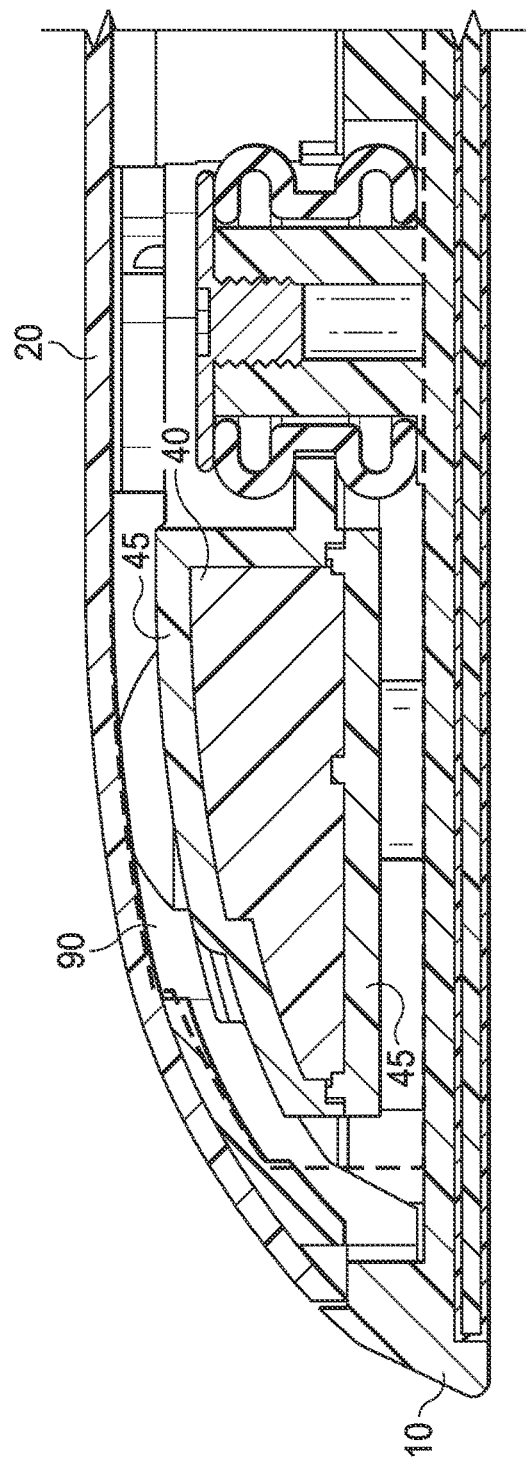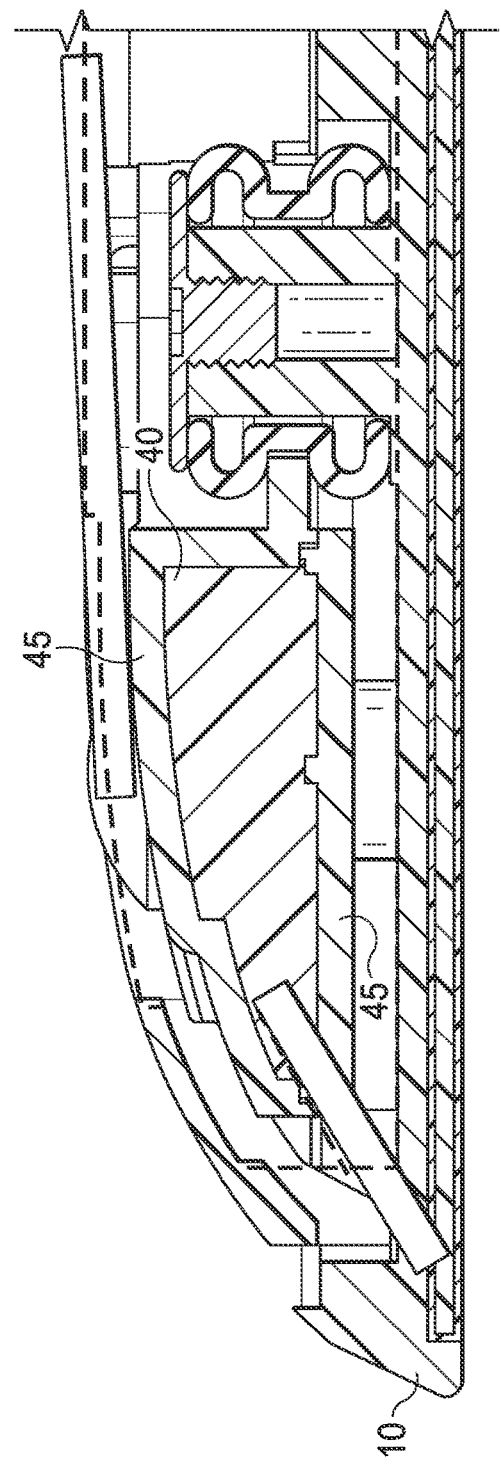

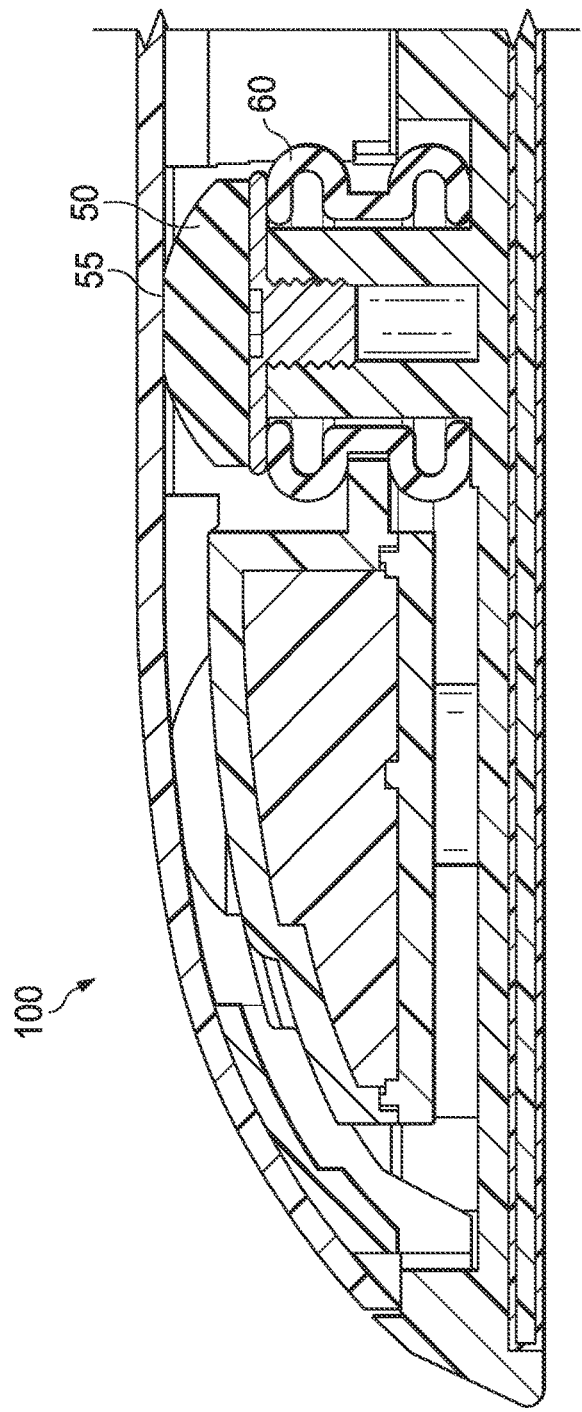

S310 — ARRANGING ONE OR MORE ELASTIC SPACERS BETWEEN THE FIRST COVER PART AND THE SECOND COVER PART SUCH THAT THE ONE OR MORE ELASTIC SPACERS COUNTERACT, BY THEIR ELASTIC RECOIL FORCES, A COMPRESSION OF THE SPEAKER VOLUME WHEN THE FIRST AND SECOND COVER PARTS ARE UNDER EXTERNAL COMPRESSING FORCES AND SUCH THAT THE ONE OR MORE ELASTIC SPACERS ARE PARTIALLY COMPRESSED BY THE FIRST AND SECOND COVER PARTS IN THE ABSENCE OF EXTERNAL COMPRESSING FORCES ON THE FIRST AND SECOND COVER PARTS

BASS RESPONSE FOR A SPEAKER IN A PORTABLE COMPUTING DEVICE

CROSS-REFERENCE TO RELATED APPLICATIONS

This application is a U.S. National Stage of International Application No. PCT/US2021/059656, filed Nov. 17, 2021, which claims priority of U.S. Provisional Application No. 63/134,228 filed Jan. 6, 2021 and International Patent Application PCT/CN2020/130553 filed Nov. 20, 2020, each of which is hereby incorporated by reference in its entirety.

TECHNICAL FIELD

The present disclosure relates to portable computing devices and methods of improving frequency response of speakers in portable computing devices.

BACKGROUND

Issues relating to gaps between a speaker box and surrounding components inside a PC, especially a portable computing device (e.g., laptop computer, tablet computer, smart phone, wearable device, smart media player, etc.), may adversely affect audio performance of the speaker. Typically, the gaps between the speaker module and any surrounding components or covers of the portable computing device should be over 1 mm. Otherwise, there will be a high risk for perceivable effects such as "rub" and "buzz". Deformation of the portable computing device's C and D covers is a key contributor to reducing clearances between the speaker box and surrounding components, and therefore to reducing audio performance.

Thus, there is a need for improved portable computing devices (e.g., laptop computers, etc.) and for methods of improving frequency response of speakers in portable computing devices. There is particular need for improving frequency response in a bass range, for example between 200 and 600 Hz.

SUMMARY

In view of the above, the present disclosure provides portable computing devices and methods of improving frequency response of speakers in portable computing devices, having the features of the respective independent claims.

According to an aspect of the disclosure, a portable computing device is provided. The portable computing device may include a first cover part and a second cover part. The first and second cover parts may be joined together to form a casing of the portable computing device. The first and second cover parts may be joined at their respective edges (e.g., circumferential edges). The casing may be a flat casing. The first cover part may be a (relatively) concave cover (e.g., bottom cover or C cover). The second cover part may be a (relatively) flat cover (e.g., top cover or D cover). A speaker volume may be formed between a portion of the first cover part and a portion of the second cover part. The speaker volume (speaker box) may be an enclosed volume formed between (the portion of) the first cover part and (the portion of) the second cover part. The portable computing device may further include a speaker arranged within the speaker volume. The portable computing device may yet further include one or more elastic spacers arranged between the first cover part and the second cover part. The one or more elastic spacers may be arranged (e.g., may be operable) to counteract, by their elastic recoil forces, a compression of the speaker volume when the first and second cover parts are under external compressing forces. Further, the one or more elastic spacers may be arranged between the first and second cover parts to be partially compressed (e.g., pre-compressed) by the first and second cover parts in the absence of external compressing forces on the first and second cover parts. Accordingly, the one or more elastic spacers may be said to be clamped between the first and second cover parts, and may be further said to be pre-loaded or pre-compressed by the first and second cover parts (e.g., by being clamped therebetween). The one or more elastic spacers may be arranged (e.g., may be operable) to be further compressed when the first and second cover parts are under external compressing forces. In general, the one or more elastic spacers may be said to be operable to maintain a size of the speaker volume between the first and second cover parts when the first and second cover parts are under external compressing forces.

By providing such pre-compressed elastic spacers, any design gaps between the speaker and surrounding components of the portable computing device can be maintained under external compressing forces. Foreseeing a smaller speaker volume by design to be able to maintain the design gaps under external compressing forces is therefore not necessary. Moreover, a volume of the speaker volume can be substantially maintained under external compressing forces. These effects contribute to ensuring a speaker back volume of sufficient size, which in turn improves audio performance of the speaker, especially in a base range, and avoids perceivable effects such as "rub" and "buzz".

In some embodiments, the one or more elastic spacers may be shaped such that an area of contact with at least one of the first cover part and the second cover part increases when the one or more elastic spacers are compressed by the first and second cover parts in the presence of external compressing forces on the first and second cover parts. Thereby, the magnitude of the elastic recoil force may be tuned to (non-linearly) increase as deformation increases.

In some embodiments, the one or more elastic spacers may have a convex shape on at least one of a first side facing the first cover part and a second side facing the second cover part. In the present context, the sides of the one or more elastic spacers may be referred to as surfaces thereof, for example. This can ensure an increasing area of contact in the presence of external compressing forces.

In some embodiments, the one or more elastic spacers may be dome-shaped on the at least one of the first side and the second side.

In some embodiments, the one or more elastic spacers may be partially compressed by the first and second cover parts in the absence of external compressing forces on the first and second cover parts by 0.12 mm to 0.15 mm compared to their compression-free sizes.

In some embodiments, the one or more elastic spacers may be arranged outside of the speaker volume. The one or more elastic spacers may be arranged in a vicinity of the speaker volume (speaker box), to be able to counteract compression of the speaker volume.

In some embodiments, the one or more elastic spacers may be arranged to counteract, by their elastic recoil forces, a reduction of a clearance between said portion of the first cover part and said portion of the second cover part when the first and second cover parts are under external compressing forces.

In some embodiments, the one or more elastic spacers may be arranged to counteract, by their elastic recoil forces, a reduction of a clearance between said portion of the first cover part and the speaker (speaker box), and/or between said portion of the second cover part and the speaker (speaker box), when the first and second cover parts are under external compressing forces.

In some embodiments, the one or more elastic spacers may be arranged at respective support features formed at one of the first and second cover parts. The support features may be ribs, bosses (e.g., screw bosses, fixation bosses, etc.), boss bars, pins, frames, etc., for example. Here, "arranged at" may mean either of "arranged on" or "arranged so as to face", for example.

In some embodiments, the one or more elastic spacers may be arranged in grommet areas connecting the first and second cover parts. The grommet areas may comprise respective grommets for damping rattling or vibration of the casing. The grommets may be formed of rubber or any other suitable (soft) damping material, for example. It is noted that the elastic spacers may be relatively harder than the grommets in some implementations.

In some embodiments, the one or more elastic spacers may be arranged at end surfaces of respective boss bars that act as grommet fixation. It is understood that the boss bars may be formed at (e.g., as portions of) one of the first and second cover parts. Here, "arranged at" may mean either of "arranged on" or "arranged so as to face", for example.

In some embodiments, the one or more elastic spacers may be arranged at end surfaces of respective screw bosses for joining the first and second cover parts or at screw heads of screws (e.g., internal screws) engaged with said screw bosses. It is understood that the screw bosses may be formed at (e.g., as portions of) one of the first and second cover parts. Here, "arranged at" may mean either of "arranged on" or "arranged so as to face".

In some embodiments, the screw bosses may act as grommet fixation.

In some embodiments, the one or more elastic spacers may be arranged at end surfaces of respective base pins that act as grommet fixation. It is understood that the base pins may be formed at (e.g., as portions of) one of the first and second cover parts. Here, "arranged at" may mean either of "arranged on" or "arranged so as to face", for example.

In some embodiments, the one or more elastic spacers may be arranged (in areas) between grommet areas connecting the first and second cover parts.

In some embodiments, the one or more elastic spacers may be arranged at a battery frame of the portable computing device. It is understood that the battery frame may be formed at (e.g., as portions of) one of the first and second cover parts. Further, the battery frame may be formed in an area between grommet areas. Here, "arranged at" may mean either of "arranged on" or "arranged so as to face", for example.

According to another aspect of the disclosure, a portable computing device is provided. The portable computing device may include a first cover part and a second cover part. The first and second cover parts may be joined together to form a casing of the portable computing device. A speaker volume may be formed between a portion of the first cover part and a portion of the second cover part. The portable computing device may further include a speaker arranged within the speaker volume. A screw boss for joining the first and second cover parts may be formed at one of the first and second cover parts, outside of the speaker volume. Further, the first and second cover parts may be joined by an external screw that engages with the screw boss such that the first and second cover parts are in direct contact with each other via the screw boss.

In some embodiments, the screw boss may act as grommet fixation.

According to another aspect of the disclosure, a method of improving frequency response of a speaker in a portable computing device is provided. The portable computing device may include a first cover part, a second cover part, and a speaker arranged within a speaker volume. The first and second cover parts may be joined together to form a casing of the portable computing device. The speaker volume may be formed between a portion of the first cover part and a portion of the second cover part. The method may include arranging one or more elastic spacers between the first cover part and the second cover part. The one or more elastic spacers may be arranged to counteract, by their elastic recoil forces, a compression of the speaker volume when the first and second cover parts are under external compressing forces. Further, the one or more elastic spacers may be arranged between the first and second cover parts to be partially compressed (e.g., pre-compressed) by the first and second cover parts in the absence of external compressing forces on the first and second cover parts. Thereby, the frequency response may be improved in a bass range. The bass range may be between 200 Hz and 600 Hz, for example.

In some embodiments, the one or more elastic spacers may be shaped such that an area of contact with at least one of the first cover part and the second cover part increases when the one or more elastic spacers are compressed by the first and second cover parts in the presence of external compressing forces on the first and second cover parts.

In some embodiments, the one or more elastic spacers may have a convex shape on at least one of a first side facing the first cover part and a second side facing the second cover part.

In some embodiments, the one or more elastic spacers may be dome-shaped on the at least one of the first side and the second side.

In some embodiments, the one or more elastic spacers may be partially compressed by the first and second cover parts in the absence of external compressing forces on the first and second cover parts by 0.12 mm to 0.15 mm compared to their compression-free sizes.

In some embodiments, the one or more elastic spacers may be arranged outside of the speaker volume.

In some embodiments, the one or more elastic spacers may be arranged to counteract, by their elastic recoil forces, a reduction of a clearance between said portion of the first cover part and said portion of the second cover part when the first and second cover parts are under external compressing forces.

In some embodiments, the one or more elastic spacers may be arranged to counteract, by their elastic recoil forces, a reduction of a clearance between said portion of the first cover part and the speaker, and/or between said portion of the second cover part and the speaker, when the first and second cover parts are under external compressing forces.

In some embodiments, the one or more elastic spacers may be arranged at respective support features formed at one of the first and second cover parts.

In some embodiments, the one or more elastic spacers may be arranged in grommet areas connecting the first and second cover parts.

In some embodiments, the one or more elastic spacers may be arranged at end surfaces of respective boss bars that act as grommet fixation.

In some embodiments, the one or more elastic spacers may be arranged at end surfaces of respective screw bosses for joining the first and second cover parts or at screw heads of screws engaged with said screw bosses.

In some embodiments, the screw bosses may act as grommet fixation.

In some embodiments, the one or more elastic spacers may be arranged at end surfaces of respective base pins that act as grommet fixation.

In some embodiments, the one or more elastic spacers may be arranged between grommet areas connecting the first and second cover parts.

In some embodiments, the one or more elastic spacers may be arranged at a battery frame of the portable computing device.

According to another aspect of the disclosure, a method of improving frequency response of a speaker in a portable computing device is provided. The portable computing device may include a first cover part, a second cover part, and a speaker arranged within a speaker volume. The first and second cover parts may be joined together to form a casing of the portable computing device. The speaker volume may be formed between a portion of the first cover part and a portion of the second cover part. The method may include forming, at one of the first and second cover parts, outside of the speaker volume, a screw boss for joining the first and second cover parts. The method may further include joining the first and second cover parts by an external screw that engages with the screw boss such that the first and second cover parts are in direct contact with each other via the screw boss.

In some embodiments, the screw boss may act as grommet fixation.

Further aspects relate to methods and systems of improving frequency response between 200 and 600 Hz for a speaker in a portable computing device. The system may include a speaker in a portable computing device. One or more dome-shaped spacers may be placed at grommet areas connecting a relatively concave C cover and a relatively flat D cover of the computing device, the one or more dome-shaped spacers being compressed by 0.12 to 0.15 mm. One or more elastic spacers may be placed in the computing device between the grommet areas, the elastic spacers being compressed and providing support for maintaining distance between the C cover and the D cover. The one or more dome-shaped spacers and/or the one or more elastic spacers may be operable to maintain a size of a speaker box between the C cover and the D cover in which the speaker is located, when the C cover and D cover are under compressing forces.

It will be appreciated that apparatus features and method steps may be interchanged in many ways. In particular, the details of the disclosed apparatus can be realized by the corresponding method(s), and vice versa, as the skilled person will appreciate. Moreover, any of the above statements made with respect to the method(s) (and, e.g., their steps) are understood to likewise apply to the corresponding apparatus (and, e.g., their components, blocks, elements, units, etc.), and vice versa.

BRIEF DESCRIPTION OF DRAWINGS

Example embodiments of the disclosure are explained below with reference to the accompanying drawings, wherein FIG. 20 and FIG. 21 show an example of a portable computing device according to embodiments of the disclosure in which an elastic spacer is added at a screw head of a screw engaged with a screw boss, FIG. 22 is a flowchart illustrating an example of a method of improving frequency response of a speaker in a portable computing device according to embodiments of the disclosure.

DETAILED DESCRIPTION

The Figures (Figs.) and the following description relate to preferred embodiments by way of illustration only. It should be noted that from the following discussion, alternative embodiments of the structures and methods disclosed herein will be readily recognized as viable alternatives that may be employed without departing from the principles of what is claimed.

Reference will now be made in detail to several embodiments, examples of which are illustrated in the accompanying figures. It is noted that wherever practicable similar or like reference numbers may be used in the figures and may indicate similar or like functionality. The figures depict embodiments of the disclosed apparatus (or method) for purposes of illustration only. One skilled in the art will readily recognize from the following description that alternative embodiments of the structures and methods illustrated herein may be employed without departing from the principles described herein.

Figure 1:
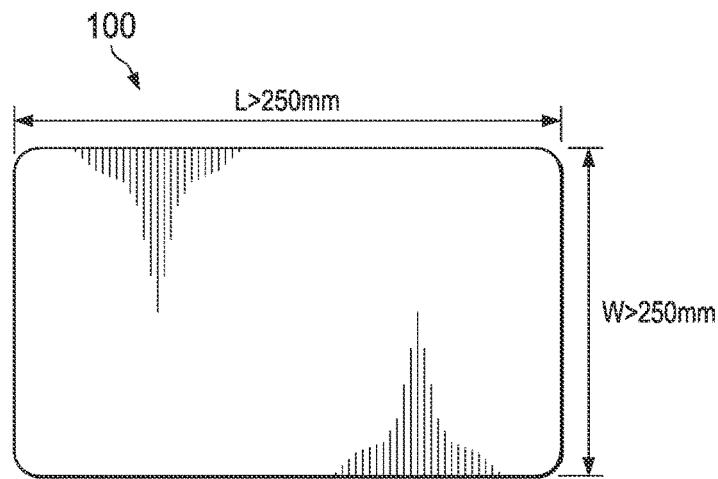
FIG. 1 is a schematic illustration of a view of an example of a casing of a portable computing device.

FIG. 1 is a schematic illustration of a view (e.g., top view or bottom view) of an example of casing of a portable computing device 100, such as a laptop computer, for example. Typical dimensions (e.g., length L and width W) of the casing of the portable computing device 100 may exceed 250 mm (e.g., L>250 mm, W>250 mm). The casing of the portable computing device 100 may be a (relatively) flat and substantially rectangular casing. It may be formed by joining a (relatively) concave first cover part (e.g., C cover or bottom cover) and a (relatively) flat second cover part (e.g., D cover or top cover). Typical values for deformation ratios under mechanical deformation for these cover parts may be 0.3% for Al stamping and plastic materials and 0.2% for Al CNC materials, for example. For the overall dimensions of the casing of the portable computing device, the maximum mechanical deformation can be more that ±0.5 mm, for example.

Figure 2:
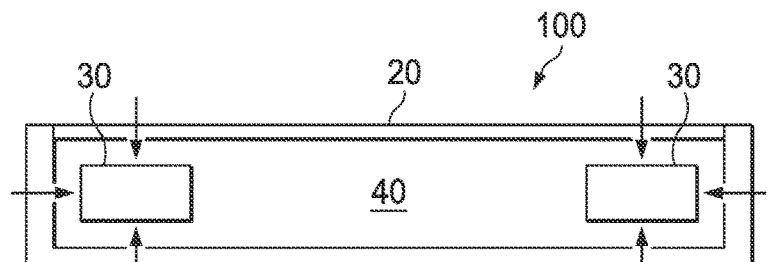
FIG. 2 is a schematic illustration of an example of speakers (speaker modules) arranged within the casing of the portable computing device, FIG. 3A and FIG. 3B schematically show examples of the casing of the portable computing device undergoing mechanical deformation under external compressing forces, FIG. 4 schematically illustrates an example of a sectional view of the portable computing device according to embodiments of the disclosure, FIG. 5 schematically illustrates an example of a normal-type grommet that can be used for placement of an elastic spacer according to embodiments of the disclosure, FIG. 6 schematically illustrates an example of a rib-type grommet that can be used for placement of an elastic spacer according to embodiments of the disclosure, FIG. 7A schematically illustrates an example of a new insert grommet that can be used for placement of an elastic spacer according to embodiments of the disclosure, FIG. 7B schematically illustrates an example of a detail of the grommet in FIG. 7A, FIG. 8 and FIG. 9 show examples of possible shapes and/or orientations of the elastic spacers according to embodiments of the disclosure, FIG. 10A and FIG. 10B schematically illustrate an example of a rib feature that can be used for placement of an elastic spacer according to embodiments of the disclosure, FIG. 11A, FIG. 11B, FIG. 12A and FIG. 12B schematically illustrate examples of a boss feature that can be used for placement of an elastic spacer according to embodiments of the disclosure, FIG. 13 schematically illustrates an example of a battery frame that can be used for placement of an elastic spacer according to embodiments of the disclosure, FIG. 14 schematically illustrates another example of a sectional view of the portable computing device according to embodiments of the disclosure.

FIG. 2 schematically illustrates an example of the casing formed by the first cover part 10 (e.g., C cover) and the second cover part 20 (e.g., D cover) and of speakers (speaker modules) 30 arranged inside a speaker volume 40 formed within the casing. Arrows indicate design gaps between the speakers 30 and surrounding components of the portable computing device 100. These design gaps typically should be more than 1 mm, for example.

Figure 3A:
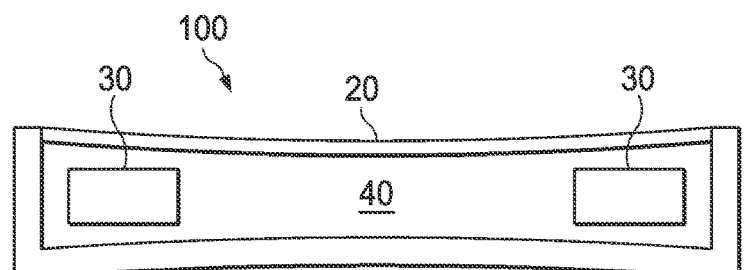
Figure 3B:
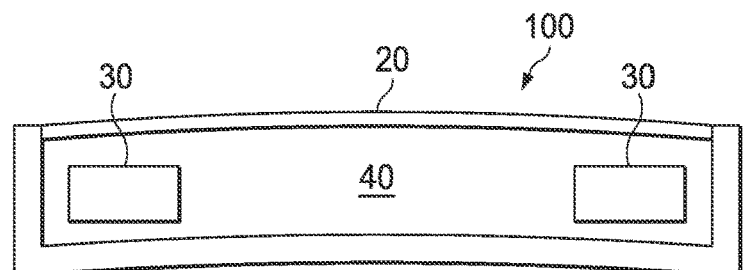

FIG. 3A and FIG. 3B schematically show examples of the casing of the portable computing device 100 under mechanical deformation. In both cases, deformation of the C and/or D covers will result in a reduction of clearances between the speaker(s) 30 and surrounding components of the portable computing device 100 (e.g., the C and D covers or internal components). Specifically, deformation of the C/D cover reduces gaps between the speaker(s) 30 surrounding components to values (much) smaller than a design target (e.g., 1 mm) in some areas. This may case a high risk for resonance rub and buzz. Conventional solutions for addressing this issue may include reducing the size of the speaker box (speaker volume) to be able to maintain gap sizes conforming to the design target, but this will reduce the speaker back cavity volume and therefore degrade bass performance of the speaker(s).

In view of the above problems, the present disclosure provides the following solution for improving speaker performance of portable computing devices (e.g., laptop computers, tablet computers, smart phones, wearable devices, smart media players, etc.) even under mechanical deformation. It is assumed, as described above, that the portable computing device 100 comprises a first cover part 10 and a second cover part 20, and that the first and second cover parts 10, 20 are joined together to form a casing of the portable computing device 100. The casing may be a flat casing in some examples. Further, the first and second cover parts 10, 20 may be joined at their respective edges (e.g., circumferential edges). The first cover part 10 may be a (relatively) concave cover (e.g., bottom cover or C cover). The second cover part 20 may be a (relatively) flat cover (e.g., top cover or D cover). It is further assumed that a speaker volume (e.g., speaker box) 40 is formed inside the casing. In other words, the speaker volume 40 (speaker box) may be an enclosed volume formed between the (portion of the) first cover part 10 and the (portion of the) second cover part 20. Specifically, the speaker volume may be formed between a portion of the first cover part 10 and a portion of the second cover part 20. It is yet further assumed that a speaker 30 is arranged within the speaker volume.

Given such portable computing device 100, the present disclosure foresees that the portable computing device 100 further comprises one or more elastic spacers arranged between the first cover part 10 and the second cover part 20. These one or more elastic spacers may be arranged in a vicinity of, yet outside of, the speaker volume 40. Further, the one or more elastic spacers are operable (e.g., are arranged) to counteract, by their elastic recoil forces, a compression of the speaker volume 40 when the first and second cover parts 10, 20 are under external compressing forces, especially external compressing forces leading to mechanical deformation, as shown in FIG. 3A and FIG. 3B, for example. Further, the one or more elastic spacers are arranged between the first and second cover parts 10, 20 to be partially compressed by the first and second cover parts in the absence of external compressing forces on the first and second cover parts. As such, the one or more elastic spacers may be said to be clamped between the first and second cover parts 10, 20. The one or more elastic spacers may be said to be pre-loaded or pre-compressed by the first and second cover parts 10, 20, for example by being clamped therebetween.

As noted above, the one or more elastic spacers may be pre-compressed even in the absence of external compressing forces acting on the first and second cover parts 10, 20. Then, the one or more elastic spacers may be arranged to be further compressed when the first and second cover parts are under external compressing forces. In this situation, their elastic recoil forces will counteract compression of the speaker volume 40. In general, the one or more elastic spacers may be said to be operable to maintain (as far as possible) a size of the speaker volume 40 between the first and second cover parts 10, 20 when the first and second cover parts 10, 20 are under external compressing forces.

Specific examples for placement of the one or more elastic spacers will be described below. In general, the one or more elastic spacers may be arranged outside of the speaker volume 40. Still, it is understood that the one or more elastic spacers are arranged in a vicinity of the speaker volume 40, to be able to counteract compression of the speaker volume 40. In other words, the one or more elastic spacers are understood to be arranged to counteract, by their elastic recoil forces, a reduction of a clearance between the speaker 30 and surrounding components of the portable computing device 100, or of a clearance between those portions of the first and second cover part 10, 20 that enclose or form the speaker volume 40, when the first and second cover parts 10, 20 are under external compressing forces. In the former case, the one or more elastic spacers may be said to counteract reduction of a clearance between the aforementioned portion of the first cover part 10 and the speaker 30, and/or between the aforementioned portion of the second cover part 20 and the speaker 30, when the first and second cover parts 10, 20 are under external compressing forces.

Regardless of placement, in some implementations the one or more elastic spacers may be shaped such that an area of contact with at least one of the first cover part 10 and the second cover part 20 (including contact with features formed at or with the first and second cover parts 10, 20) increases when the one or more elastic spacers are compressed by the first and second cover parts 10, 20 in the presence of external compressing forces acting on the first and second cover parts 10, 20. This increase of area of contact can be realized, for example, when the one or more elastic spacers have a convex shape on at least one of a first side (first surface) facing the first cover part 10 and a second side (second surface) facing the second cover part 20. In a specific example, the one or more elastic spacers may be dome-shaped on the at least one of the first side and the second side.

As noted above, the one or more elastic spacers may be pre-compressed (partially compressed) by the first and second cover parts 10, 20 even in the absence of external compressing forces on the casing. In one example implementation, the one or more elastic spacers may be partially compressed by the first and second cover parts 10, 20 in the absence of external compressing forces on the first and second cover parts 10, 20 by 0.12 mm to 0.15 mm compared to their compression-free sizes.

Different options may be available for arranging or placing the one or more elastic spacers within the casing of the portable computing device 100. Examples of possible arrangements or placements will now be described with reference to FIG. 4 to FIG. 13.

Figure 4:
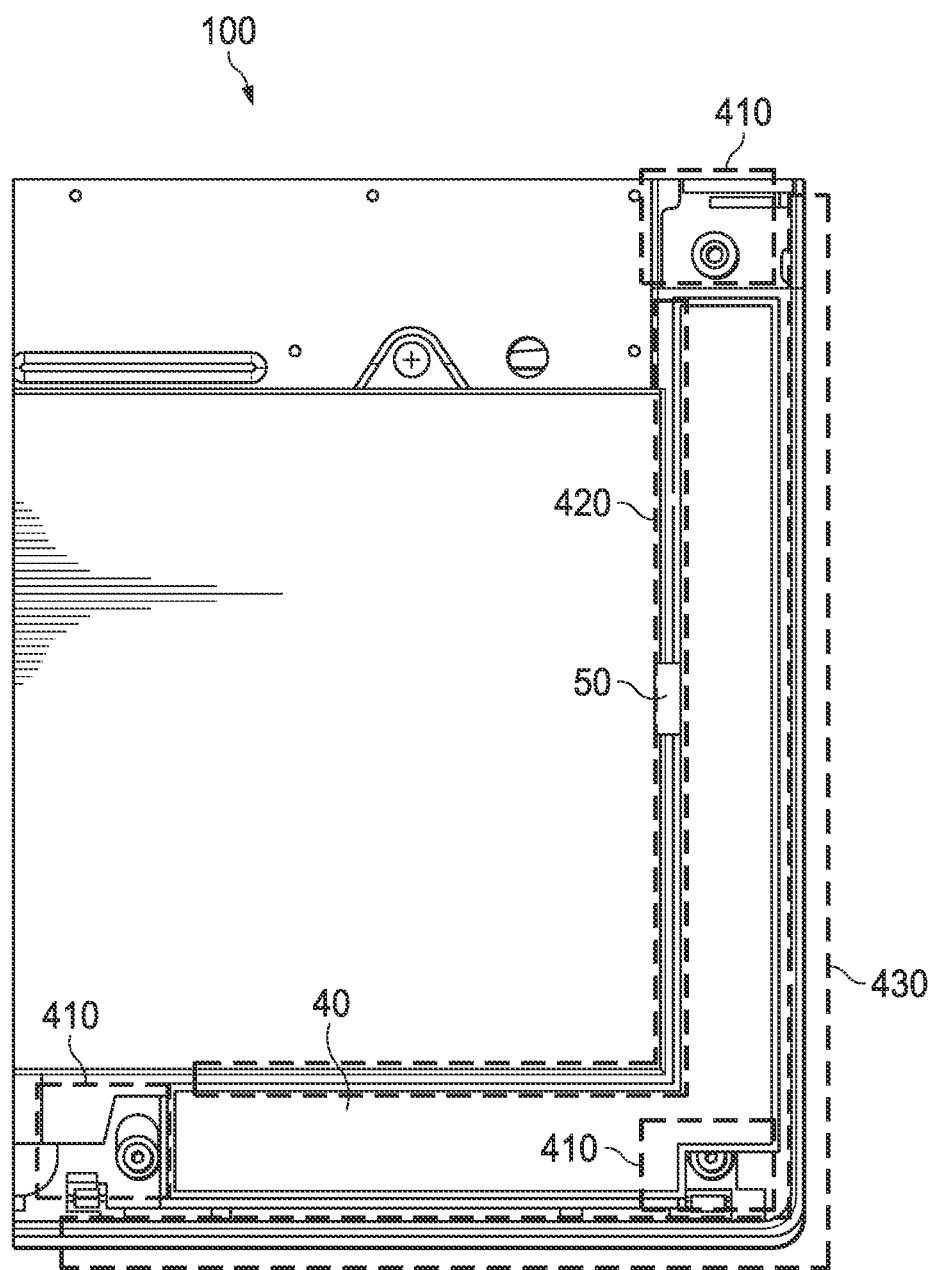

FIG. 4 schematically illustrates an example of a sectional view of the portable computing device 100. Several areas of the portable computing device 100 may be considered for arranging the one or more elastic spacers. Area A, 420, is an area between grommet areas of the portable computing device 100. Areas B, 410, are grommet areas of the portable computing device 100. Area C, 430, is an area in which the first and second cover parts 10, 20 are joined to each other. The speaker volume 40 may be formed between areas A and C, for example.

For the areas defined above, the following solutions for improving speaker performance and placements of elastic spacers may be considered.

Solution 1: In area(s) B, add elastic spacers for supporting in grommet areas.

Solution 2: In area A, add support features and elastic spacers, or use battery frame for placement of elastic spacers.

Solution 3: In area(s) B, use external screw that joins cover parts and screw boss for support, for example using a grommet fixation boss as the screw boss.

It is understood that solutions 1, 2, and 3 may be implemented separately or in any combinations of two or three solutions.

Further, regardless of placement area the one or more elastic spacers may be arranged at respective support features formed at one of the first and second cover parts 10, 20. These support features may be ribs, bosses (e.g., screw bosses, fixation bosses, etc.), boss bars, pins, frames, etc., for example. Here and elsewhere throughout the disclosure, "arranged at" may mean either of "arranged on" or "arranged so as to face", for example.

Examples of implementation details for solution 1 (elastic spacers in grommet areas) will be described next with reference to FIG. 5 to FIG. 9. Grommet areas in the present context may be those areas in which the first and second cover parts 10, 20 are connected or fixed to each other by appropriate means. These grommet areas may comprise respective grommets for damping rattling or vibration of the casing. The grommets may be formed of rubber or any other suitable damping material, for example. The grommet material may be relatively softer than a material used for forming the one or more elastic spacers, for example.

Figure 5:
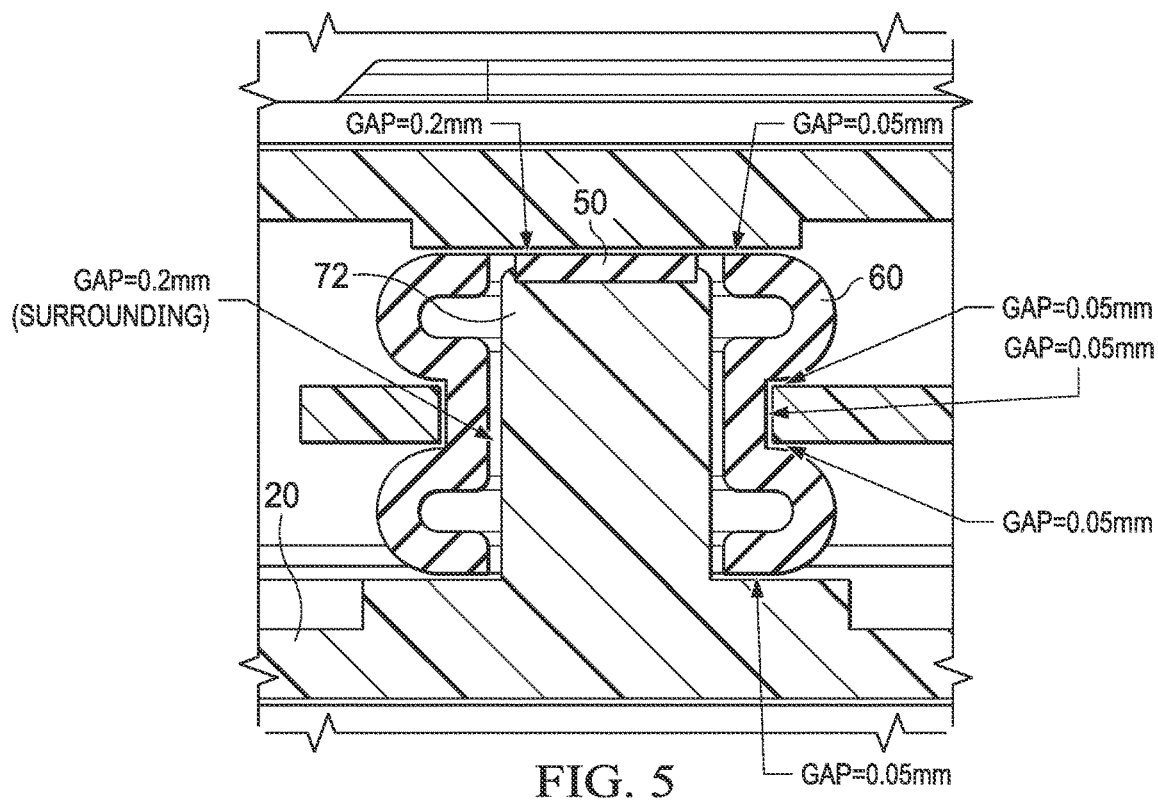

FIG. 5 schematically illustrates an example of a normal-type grommet that can be used for placement of an elastic spacer. In this example, a boss bar 72 is formed as part (feature, portion) of the second cover part 20 (e.g., D cover) and acts as fixation (grommet fixation) for grommet 60. The grommet 60 may be a normal-type grommet in this example. An elastic spacer 50 is arranged at an end surface of the boss bar 72. In general, the one or more elastic spacers 50 may be arranged at end surfaces of respective boss bars 72 that act as grommet fixation. With this arrangement, the elastic spacer(s) 50 fill out the gap between the end surface of the boss bar 72 and the component opposite the end surface of the boss bar 72 for support. This gap may be about 0.2 mm in typical implementations.

While FIG. 5 shows the elastic spacer 50 to be attached to the boss bar 72, it is understood that it may likewise be attached to a portion opposite the end surface of the boss bar 72. In this sense, "arranged at" may mean either of "arranged on" or "arranged so as to face", for example, as indicated above. Further, in alternative implementations the boss bar 72 may be formed as part of the first cover part 10.

Although FIG. 5 shows a gap between the elastic spacer 50 and the component opposite the end surface of the boss bar 72, it is understood that in a manufactured state of the portable computing device, the elastic spacer 50 will be pre-compressed even in the absence of external compressing forces acting on the casing.

Moreover, although FIG. 5 shows a substantially flat elastic spacer 50, it is understood that the elastic spacer 50 may have different shape, such as a shape with a convex surface on at least one side of the elastic spacer 50. For example, the elastic spacer 50 may be dome-shaped.

Figure 6:
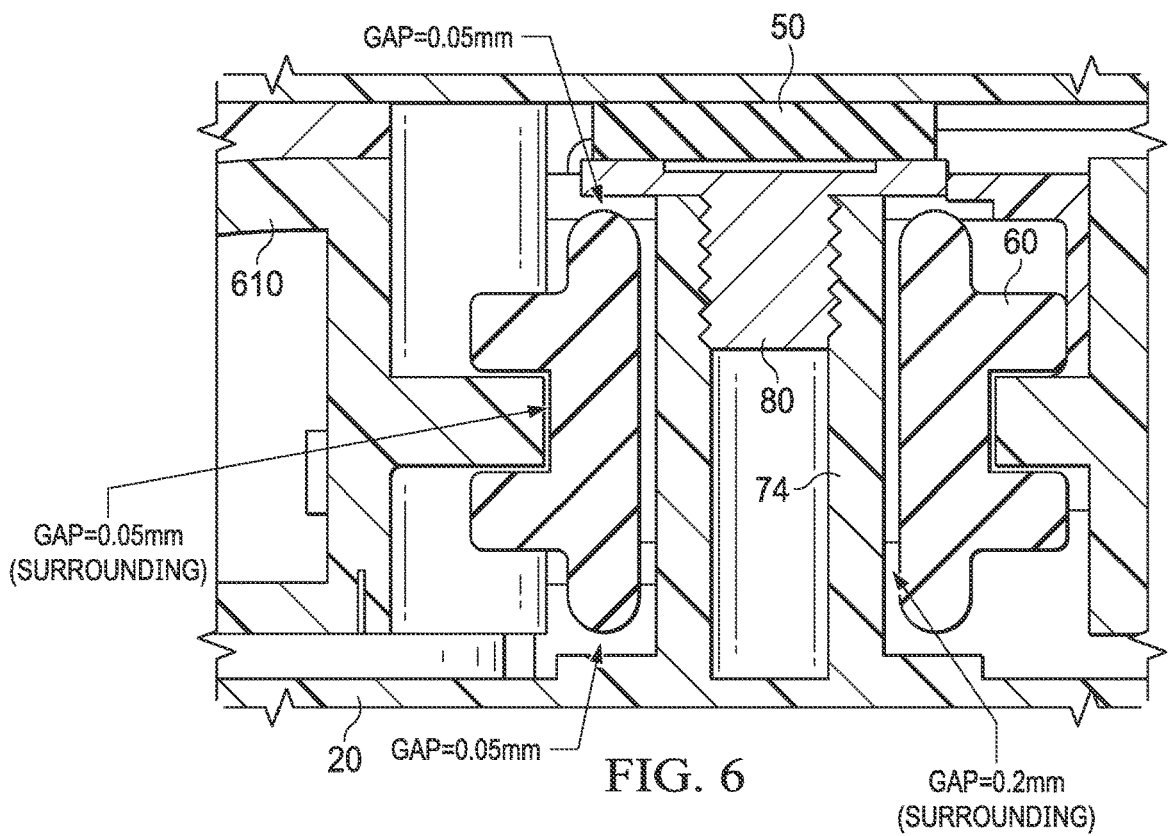

FIG. 6 schematically illustrates an example of a rib-type grommet that can be used for placement of an elastic spacer. In this example, a screw boss 74 is formed as part (feature, portion) of the second cover part 20 (e.g., D cover). The screw boss 74 is provided for joining the first and second cover parts 10, 20 and moreover may act as fixation (grommet fixation) for grommet 60. The grommet 60 may be a rib-type grommet in this example. An (internal) screw 80 is engaged with (e.g., screwed into) the screw boss 74 for joining the first and second cover parts 10, 20 (e.g., fixing the first and second cover parts 10, 20 against each other). Also shown is a module 610 of the portable computing device 100 that is partially surrounded by part of the grommet 60 with a gap therebetween. An elastic spacer 50 is arranged at an end surface of the screw boss 74 or at a screw head of the screw 80. In general, the one or more elastic spacers 50 may be arranged at end surfaces of respective screw bosses 74 for joining the first and second cover parts 10, 20 or at screw heads of screws engaged with these screw bosses 74. With this arrangement, the elastic spacer(s) 50 fill out the gap between the end surface of the screw boss 74 (or the screw head) and the component opposite the end surface of the screw boss 74 for support.

Again, while FIG. 6 shows the elastic spacer 50 to be attached to the screw boss 74 or screw head, it is understood that it may likewise be attached to a portion opposite the end surface of the screw boss 74 or screw head. In this sense, "arranged at" may mean either of "arranged on" or "arranged so as to face", for example, as indicated above. Further, in alternative implementations the screw boss 74 may be formed as part of the first cover part 10.

Moreover, although FIG. 6 shows a substantially flat elastic spacer 50, it is understood that the elastic spacer 50 may have different shape, such as a shape with a convex surface on at least one side of the elastic spacer 50. For example, the elastic spacer 50 may be dome-shaped.

Figure 7A:
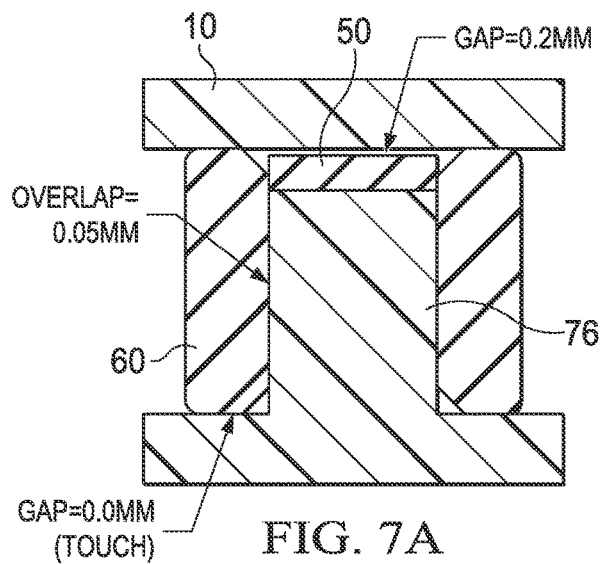
Figure 7B:
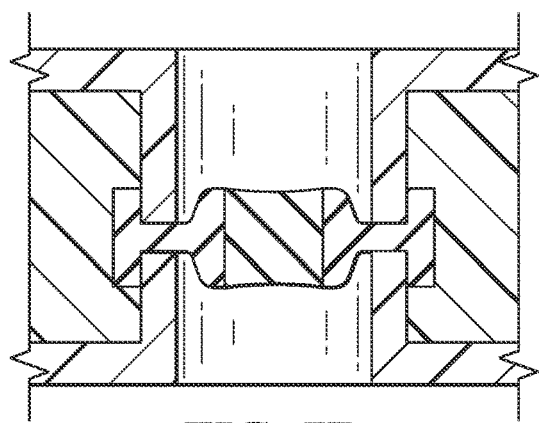

FIG. 7A schematically illustrates an example of a new insert grommet that can be used for placement of an elastic spacer. In this example, a base pin 76 is formed as part (feature, portion) of the second cover part 20 (e.g., D cover) and acts as fixation (grommet fixation) for grommet 60. An elastic spacer 50 is arranged at an end surface of the base pin 76. In general, the one or more elastic spacers 50 may be arranged at end surfaces of respective base pins 76 that act as grommet fixation. With this arrangement, the elastic spacer(s) 50 fill out the gap between the end surface of the base pin 76 and the component opposite the end surface of the base pin 76 (e.g., the first cover part 10 in this example) for support. The grommet 60 may be an insert grommet in this example, such as a DB-bridge grommet. An example of a detail of such grommet 60 is schematically illustrated in FIG. 7B.

While FIG. 7A shows the elastic spacer 50 to be attached to the base pin 76, it is understood that it may likewise be attached to a portion opposite the end surface of the base pin 76. In this sense, "arranged at" may mean either of "arranged on" or "arranged so as to face", for example, as indicated above. Further, in alternative implementations the base pin 76 may be formed as part of the first cover part 10.

Although FIG. 7A shows a gap between the elastic spacer 50 and the component opposite the end surface of the base pin 76, it is understood that in a manufactured state of the portable computing device, the elastic spacer 50 will be pre-compressed even in the absence of external compressing forces acting on the casing.

Moreover, although FIG. 7A shows a substantially flat elastic spacer 50, it is understood that the elastic spacer 50 may have different shape, such as a shape with a convex surface on at least one side of the elastic spacer 50. For example, the elastic spacer 50 may be dome-shaped.

Figure 8:
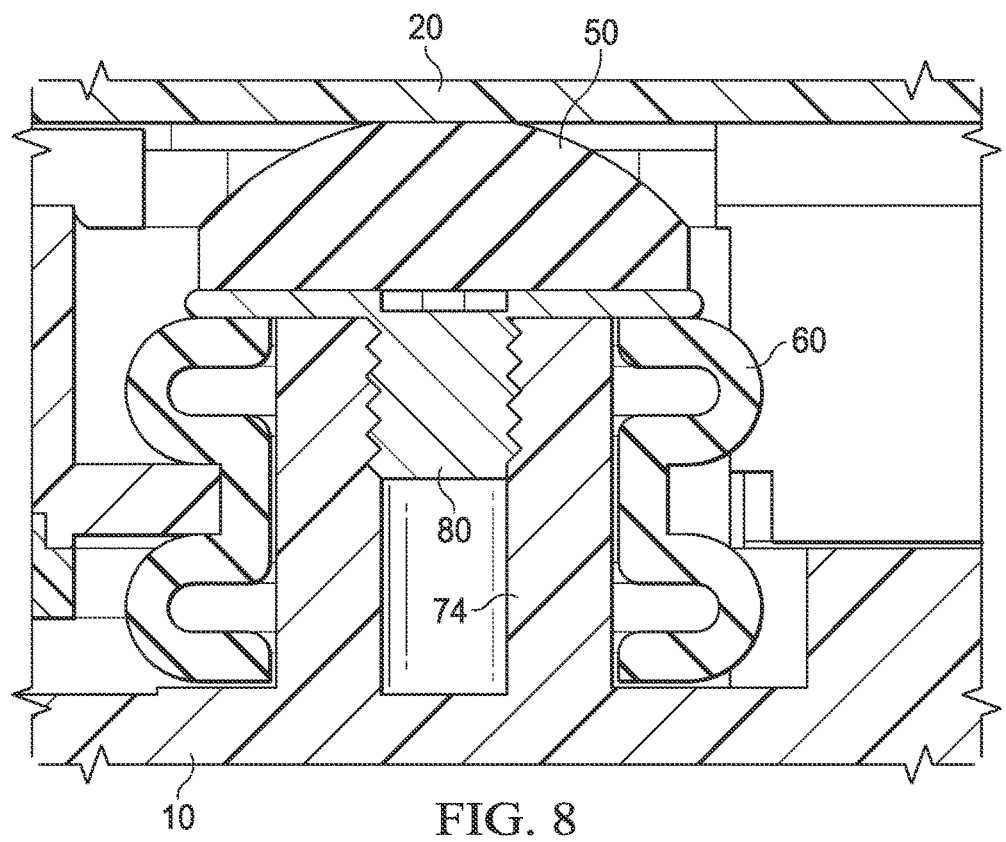
Figure 9:
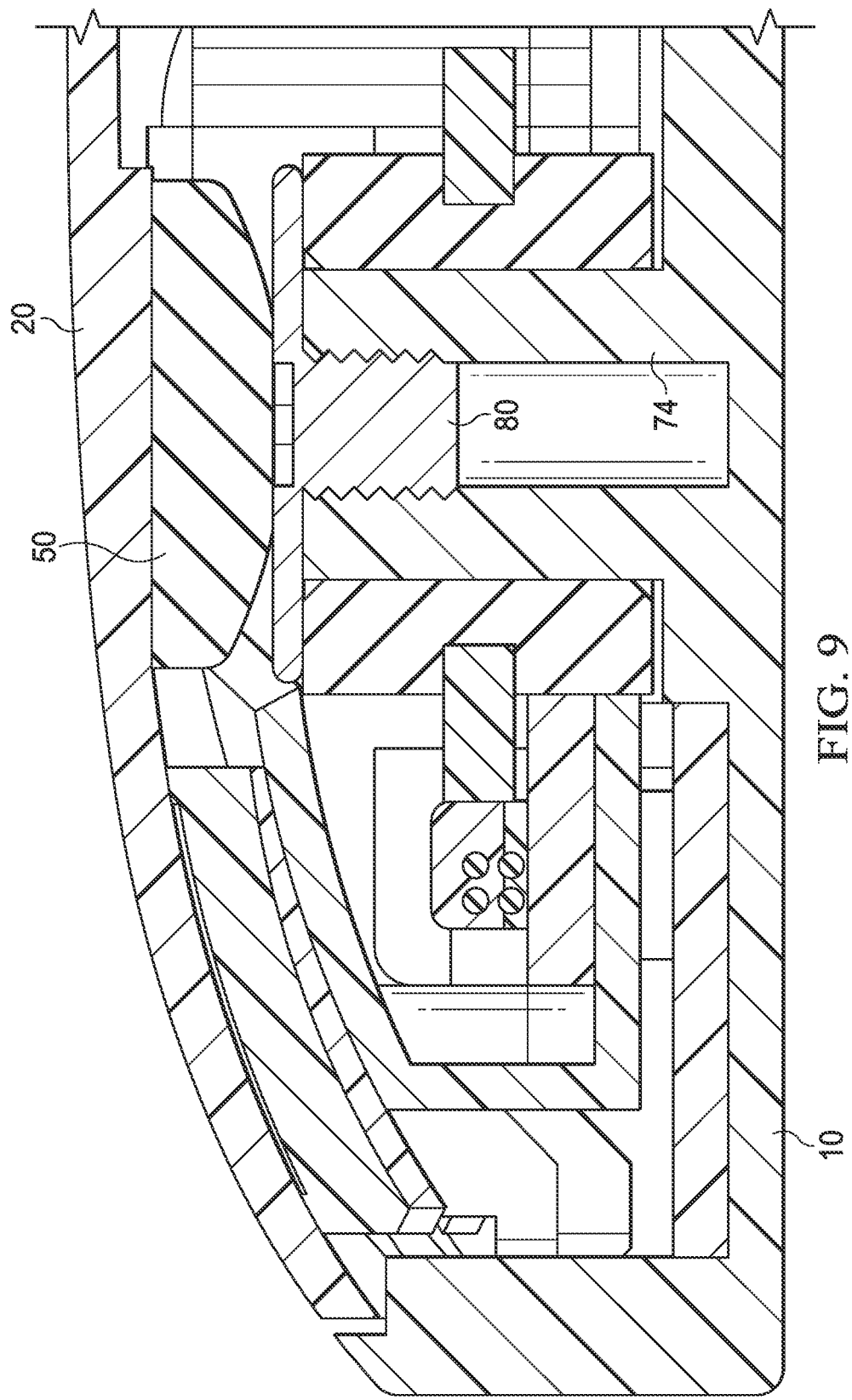

FIG. 8 and FIG. 9 show examples of possible shapes and/or orientations of the elastic spacers 50 that may be used for example in conjunction with the arrangements described above and elsewhere throughout the disclosure.

FIG. 8 shows another example of an elastic spacer 50 arranged at a screw head of a screw 80 that is engaged with a screw boss 74. The screw boss 74 is formed as part (e.g., feature, portion) of one of the first and second cover parts 10, 20 (the first cover part 10 in the present example) and acts as grommet fixation for grommet 60. The elastic spacer 50 is convex-shaped (e.g., dome-shaped) on at least one side and is (pre-)compressed by the other one of the first and second cover parts 10, 20 (the second cover part 20 in the present example). In this example, the convex-shaped side of the elastic spacer 50 faces the other one of the first and second cover parts 10, 20, whereas the flat side of the elastic spacer faces the screw head. As can be seen in FIG. 8, the (pre-compressed) elastic spacer 50 has a certain area of contact with the second cover part 20 even in the absence of external compressing forces acting on the casing formed by the first and second cover parts 10, 20. When the casing is under external compressing forces, the elastic spacer 50 will be further compressed and counteract compression of the casing by means of its elastic recoil forces. As a result of this further compression, the area of contact between the elastic spacer 50 and the second cover part 20 will increase, and so will the elastic recoil force that counteracts further compression of the elastic spacer 50. Thereby, the magnitude of the elastic recoil force exerted by the elastic spacer 50 (non-linearly) increases as the elastic spacer 50 is compressed under external compressing forces acting on the casing. Needless to say, this property is a result of the shape of the elastic spacer 50 and is independent of the specific arrangement of the elastic spacer 50 shown in the example of FIG. 8.

FIG. 9 shows another example of an elastic spacer 50 arranged at a screw head of a screw 80 that is engaged with a screw boss 74. The screw boss 74 is formed as part (e.g., feature, portion) of one of the first and second cover parts 10, 20 (the first cover part 10 in the present example). The screw boss 74 may or may not act as grommet fixation. The elastic spacer 50 is convex-shaped (e.g., dome-shaped) on at least one side and is (pre-)compressed by the other one of the first and second cover parts 10, 20 (the second cover part 20 in the present example). In this example, the convex-shaped (e.g., dome-shaped) side of the elastic spacer 50 faces the screw head, whereas a flat side of the elastic spacer faces the other one of the first and second cover parts 10, 20.

Regardless of this change of orientation compared to the example of FIG. 8, the functionality of the elastic spacer 50 remains the same. Also in this case, the area of contact between the elastic spacer 50 and the respective surrounding component facing the convex-shaped side of the elastic spacer 50 will increase under compression by external compressing forces acting on the casing. Needless to say, this property is a result of the shape of the elastic spacer 50 and is independent of the specific arrangement of the elastic spacer 50 shown in the example of FIG. 9.

Examples of implementation details for aforementioned solution 2 (elastic spacers at support features or battery frame in areas between grommet areas) will be described next with reference to FIG. 10 to FIG. 13. As noted above, grommet areas may be those areas connecting the first and second cover parts 10, 20.

Figure 10A:
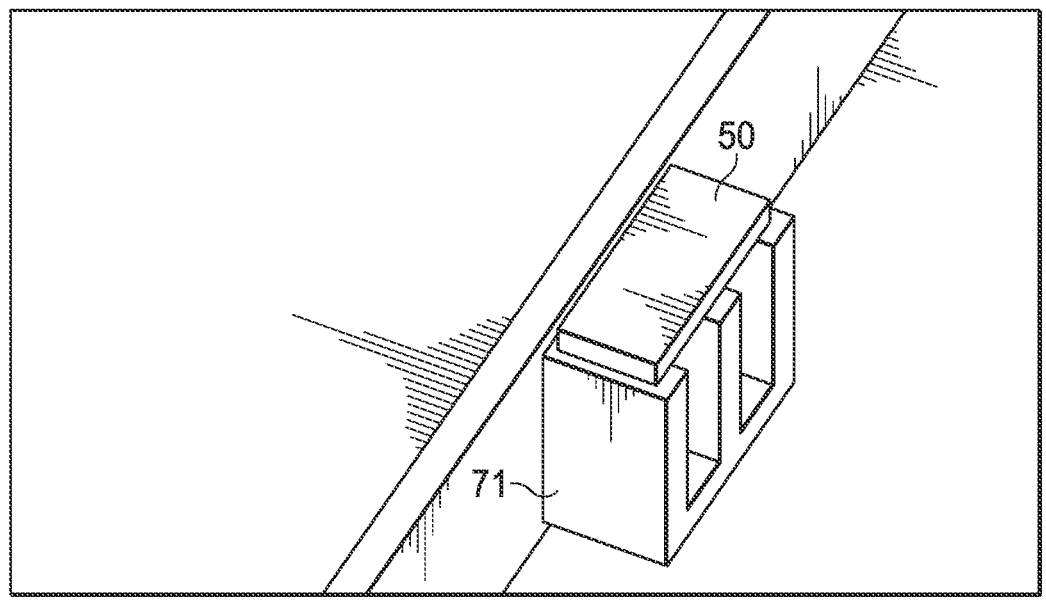
Figure 10B:
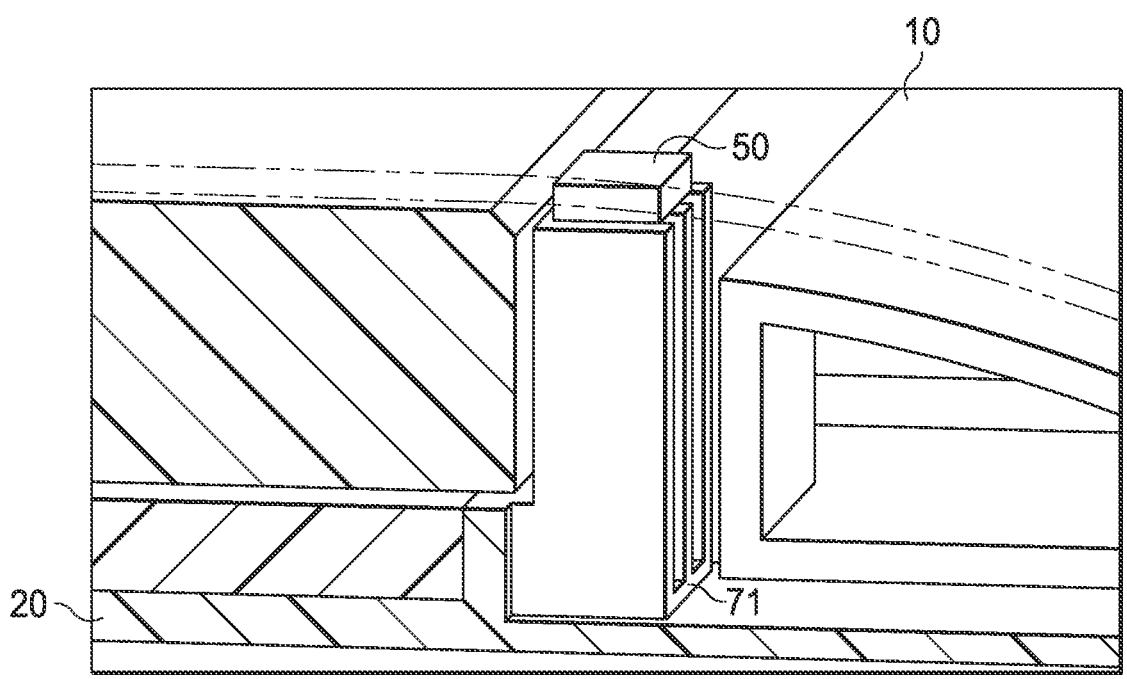

FIG. 10A schematically illustrates an example of a rib (e.g., support rib) that can be used for placement of an elastic spacer 50. In this example, a rib 71 is formed as part (feature, portion) of one of the first and second cover parts 10, 20. An elastic spacer 50 is arranged at (an end surface of) the rib 71. In general, the one or more elastic spacers 50 may be arranged at end surfaces of respective ribs 71. With this arrangement, the elastic spacer(s) 50 fill out the gap between the end surface of the rib 71 and the component (e.g., the other one of the first and second cover parts 10, 20) opposite the end surface of the rib 71 for support. In this example, the elastic spacer 50 may have a size of few mm in each dimension, for example about 4.5 mm×2 mm×0.6 mm. FIG. 10B shows an example of another view of the elastic spacer 50 arranged at the rib 71.

Figure 11A:
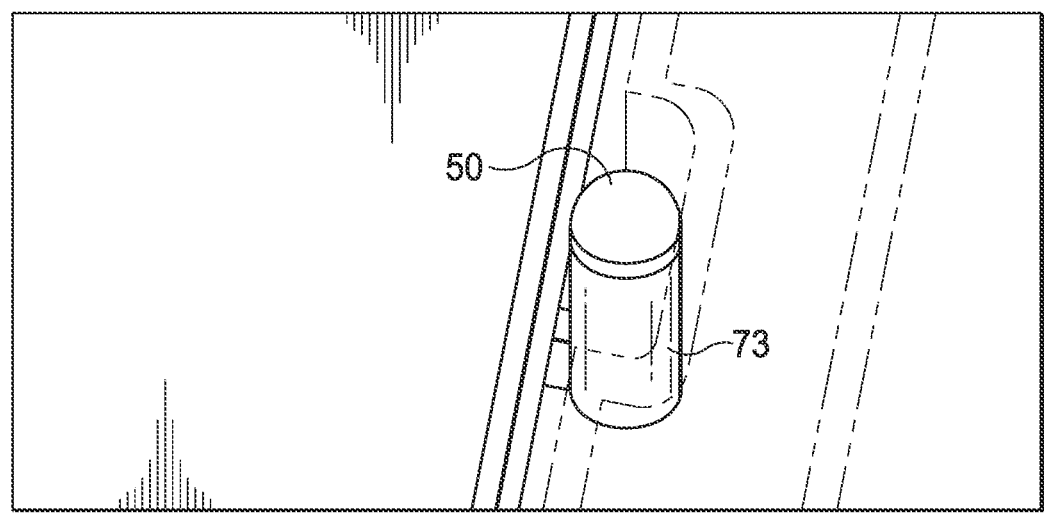
Figure 11B:
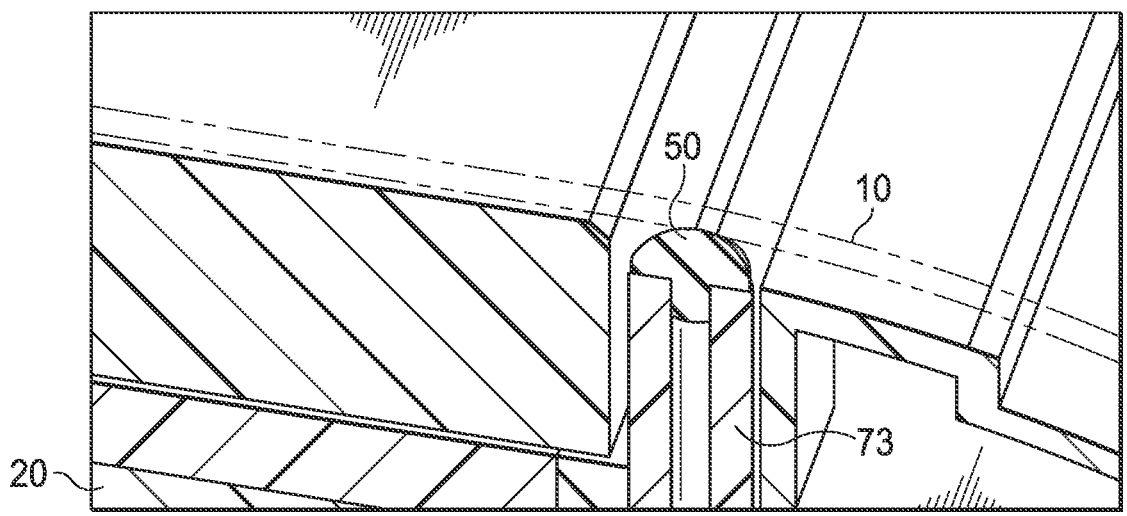

FIG. 11A schematically illustrates an example of a boss 73 (boss feature) that can be used for placement of an elastic spacer 50. The boss 73 may be formed as part (feature, portion) of one of the first and second cover parts 10, 20. The elastic spacer may be tight-fit into the boss 73. FIG. 11B shows an example of a sectional view of the elastic spacer 50 tight-fit into the boss 73.

Figure 12A:
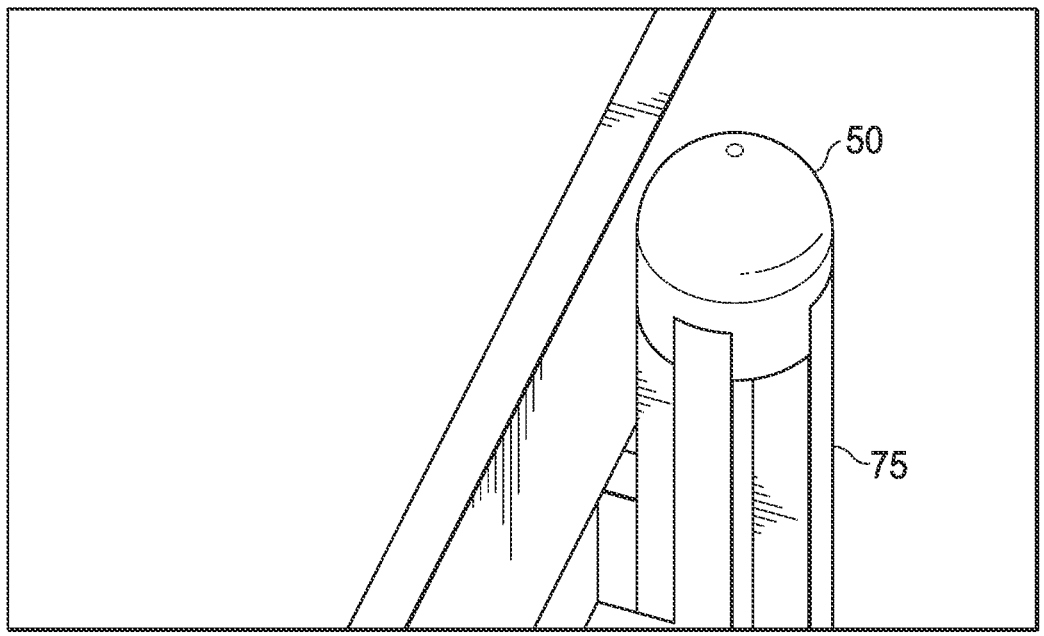

FIG. 12A schematically illustrates another example of a boss 75 (boss feature) that can be used for placement of an elastic spacer 50. The boss 75 may be formed as part (feature, portion) of one of the first and second cover parts 10, 20. The elastic spacer 50 may be tight-fit into the boss

Figure 12B:
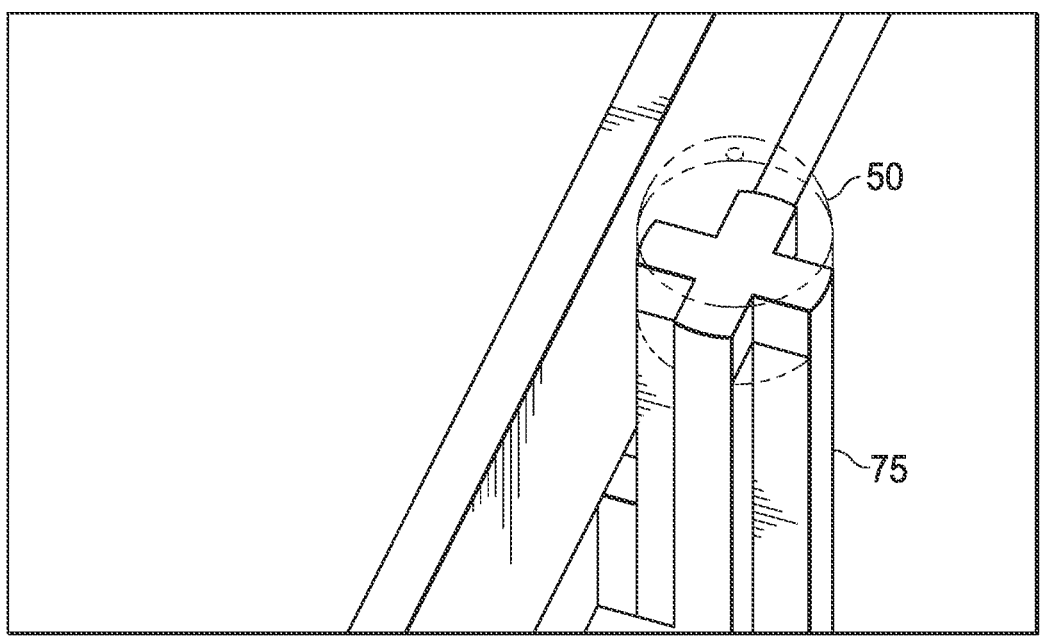

75. FIG. 12B shows an example of a sectional view of the elastic spacer 50 tight-fit into the boss 75.

Figure 13:
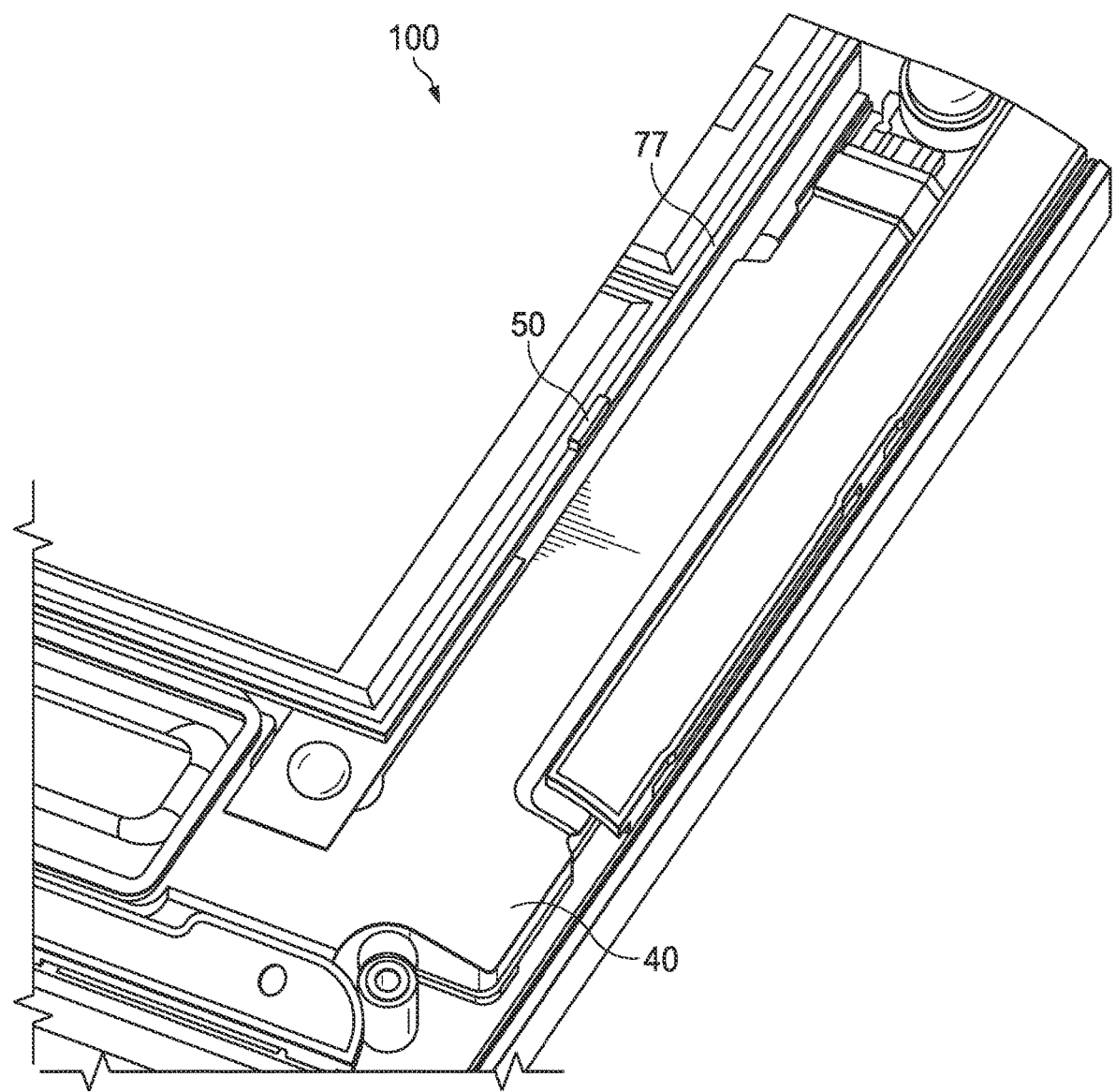

FIG. 13 schematically illustrates an example of a battery frame 77 that can be used for placement of an elastic spacer 50. Advantageously, the battery frame 77 is typically provided in a vicinity of the speaker volume 40. Using the battery frame 77 as support for the elastic spacer 50 thus allows to add the elastic spacer 50 without having to add new support features.

In general, the one or more elastic spacers 50 may be arranged at a battery frame of the portable computing device. Here, it is understood that the battery frame may be formed at (e.g., as portions of) one of the first and second cover parts 10, 20. Also, "arranged at" may mean either of "arranged on" or "arranged so as to face", for example, as noted earlier.

As noted above for solution 1, the shapes and/or orientations of the spacer 50 are not limited to what is shown in, for example, FIG. 11 to FIG. 13. Further, it is understood that the considerations with regard to the shape/orientation of the elastic spacer 50 as set out in connection with FIG. 8 and FIG. 9 apply to any embodiment and implementation described throughout the present disclosure.

Figure 14:
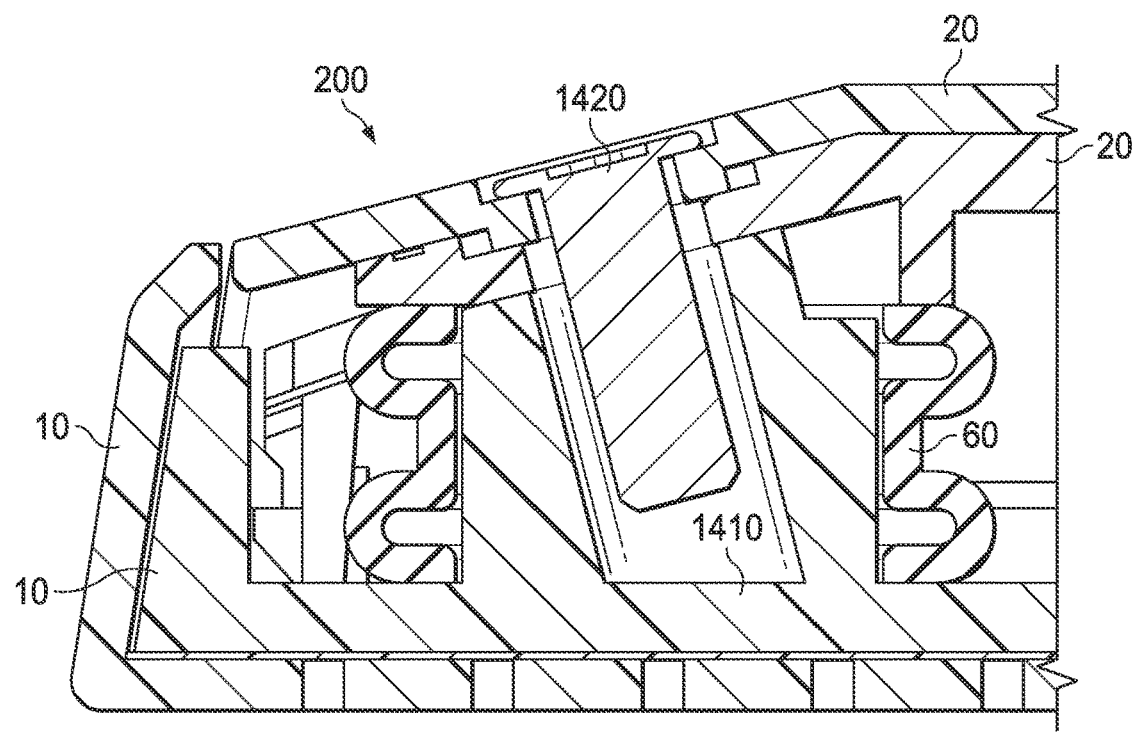

Examples of implementation details for solution 3 (use of external screw and screw boss for support in grommet areas) will be described next with reference to FIG. 14. In this example, without intended limitation, screw boss 1410 of the portable computing device 200 is formed as part (portion, feature) of the first cover part 10 (e.g., C cover). Notably, without intended limitation, both the first and second cover parts 10, 20 are shown as comprising several distinct portions. An external screw 1420 engages with the screw boss 1410 to fix the first and second cover parts 10, 20 to each other to be in contact with each other at the screw boss 1410. In other words, there is no gap between the first and second cover parts 10, 20 at a position of the screw boss 1410. The screw boss 1410 may also act as grommet fixation for grommet 60 in this example. Assuming that the screw boss 1410 is provided in a vicinity of the speaker volume 40, a compression amount of the speaker volume 40 under external compressing forces is small, since there is no gap between the first and second cover parts at the position of the screw boss 1410.

In general, assuming a portable computing device as set out above, according to solution 3 a screw boss 1410 for joining the first and second cover parts 10, 20 may be formed at one of the first and second cover parts 10, 20, outside of the speaker volume 40. Then, the first and second cover parts 10, 20 may be joined by an external screw 1420 that engages with the screw boss 1410 such that the first and second cover parts 10, 20 are in direct contact with each other via the screw boss 1410 (e.g., without a gap therebetween). Additionally, as noted above, the screw boss 1410 may act as grommet fixation.

Figure 15:
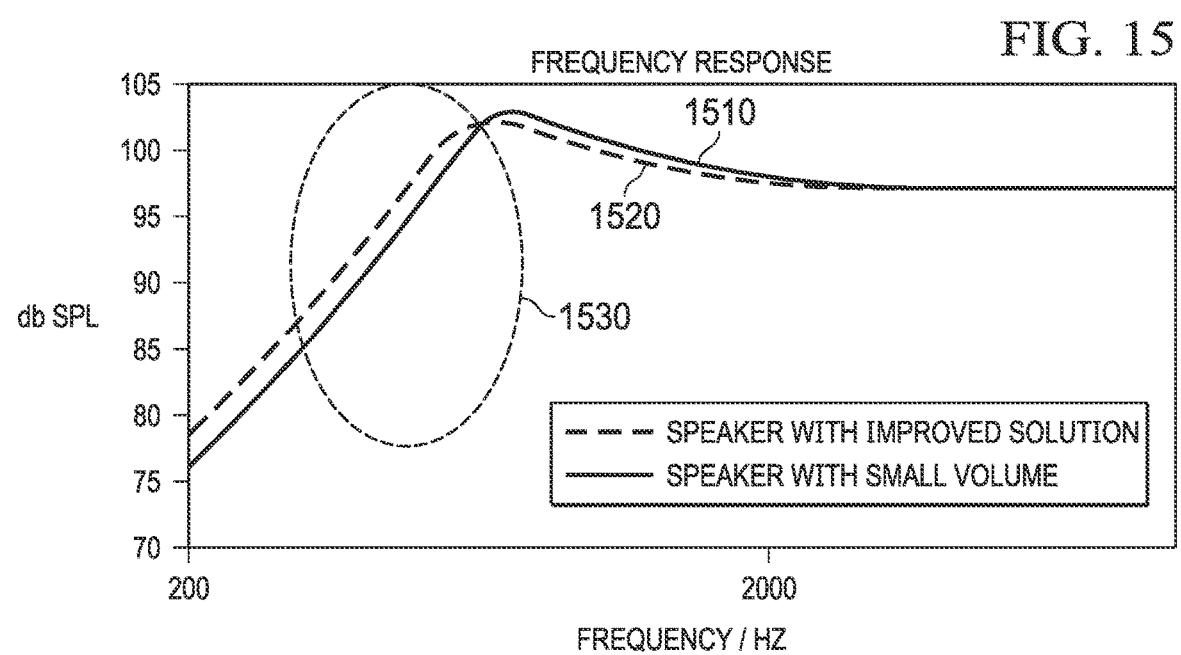
FIG. 15 is a diagram showing examples of frequency responses for portable computing devices according to embodiments of the disclosure and conventional portable computing devices, FIGS. 16A-C, FIG. 17A and FIG. 17B schematically illustrate an example of a portable computing device under external compressing forces.

FIG. 15 is a diagram showing examples of frequency responses for portable computing devices according to the present disclosure and conventional portable computing devices. The horizontal axis indicates frequency (in Hz) and the vertical axis indicates sound pressure level (SPL, in dB). Graph 1510 shows frequency response for a speaker in a conventional portable computing device (small speaker volume). Graph 1520 shows frequency response for a speaker in a portable computing device according to embodiments of the present disclosure. Circle 1530 indicates an example of a frequency region in which bass performance is improved.

As can be seen from comparing graphs 1510 and 1520, the speaker in a portable computing device according to embodiments of the present disclosure, i.e., with improved gap control design, will have a bigger back volume compared to traditional small-volume designs under comparable external compressing forces. This improves acoustic performance, especially bass performance of the speaker.

Next, examples of applications of embodiments of the present disclosure to a typical use case will be described with reference to FIG. 16 to FIG. 21.

Figure 16A:
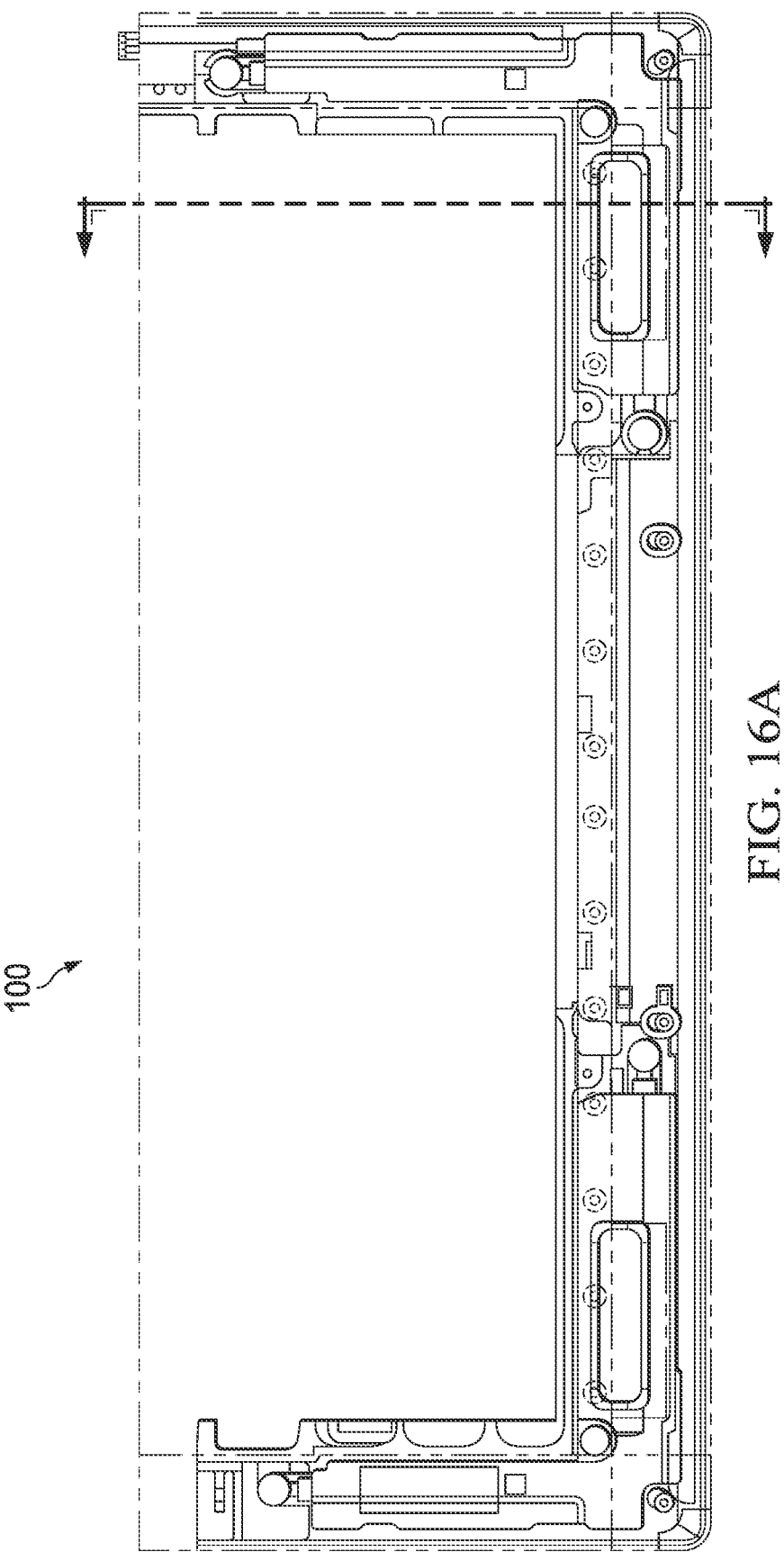
Figure 17A:
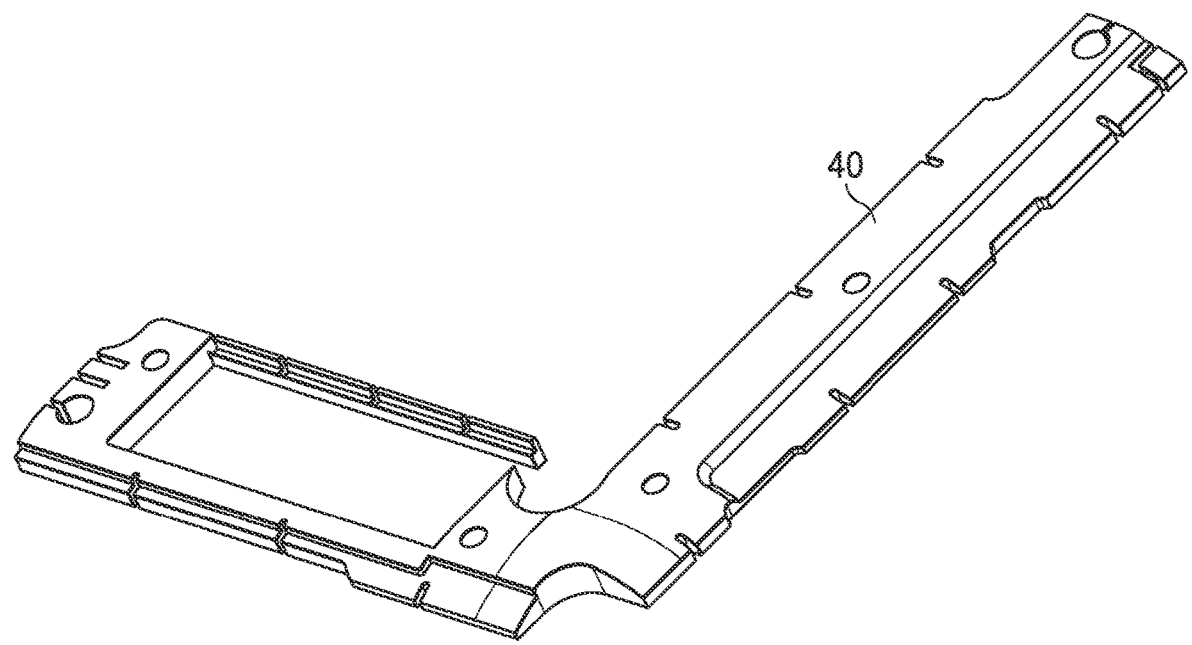
Figure 17B:
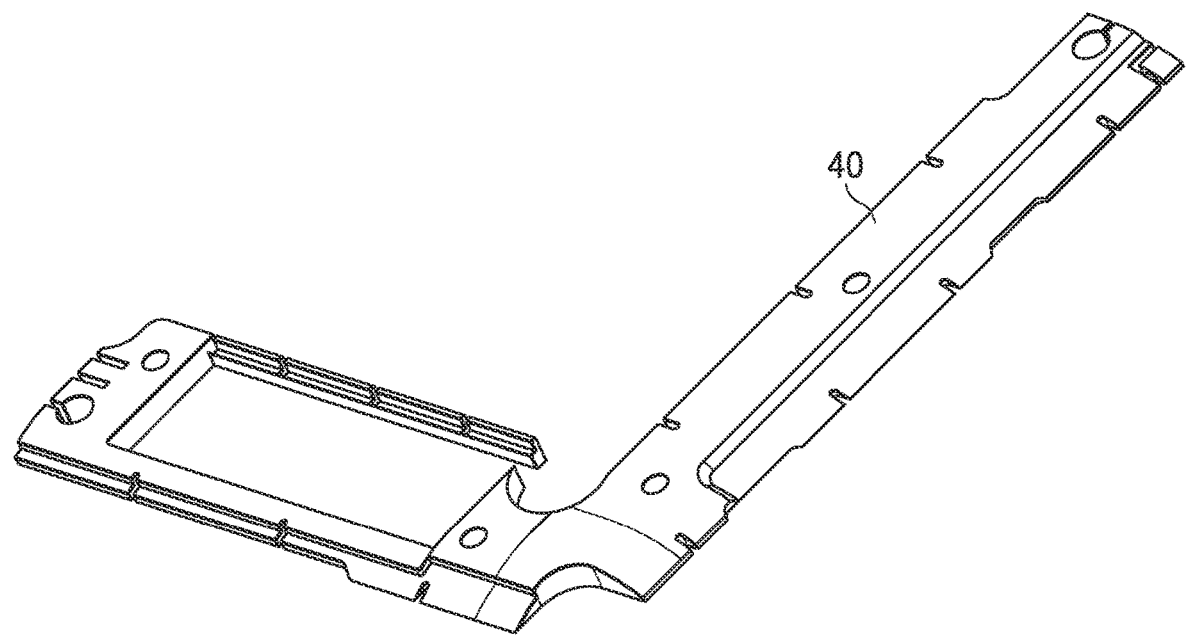

FIGS. 16A-C illustrate a portable computing device not according to embodiments of the present disclosure, e.g., without added elastic spacers. FIG. 16A shows part of a portable computing device. FIG. 16B shows a section through the portable computing device as indicated in FIG. 16A, in the absence of external compressing forces. In this portable computing device, a speaker volume 40 (speaker back cavity volume) is surrounded by a speaker box 45, which in turn is enclosed between the first and second cover parts 10, 20. As an example, a gap 90 may be formed between the first and second cover parts 10, 20 and the speaker box 45. This gap 90 may have a design target value, such as 1 mm, for example. FIG. 16C shows the same section through the portable computing device, this time under external compressing forces acting on the casing. As indicated by additional bars, for example the second cover part 20 may be easily deformed and may have a maximum deformation of 0.5 mm under external compressing forces. This would reduce the gap 90, for example by 0.5 mm. In order to still retain the target design value for the gap 90, the speaker volume 40 will be reduced accordingly, for example by 16% in this example. This reduction in volume of the speaker box is shown in FIG. 17A (no external compressing forces) and FIG. 17B (external compressing forces), where an example volume of the speaker volume 40 is reduced from 3629 mm$^3$ to 2999 mm$^3$. Using elastic spacers as set out in the present disclosure on the other hand allows to better maintain the size of the speaker volume 40 under external compressing forces acting on the casing and also to maintain the design gap between the speaker box 45 and the first and second cover parts 10, 20.

Figure 18:
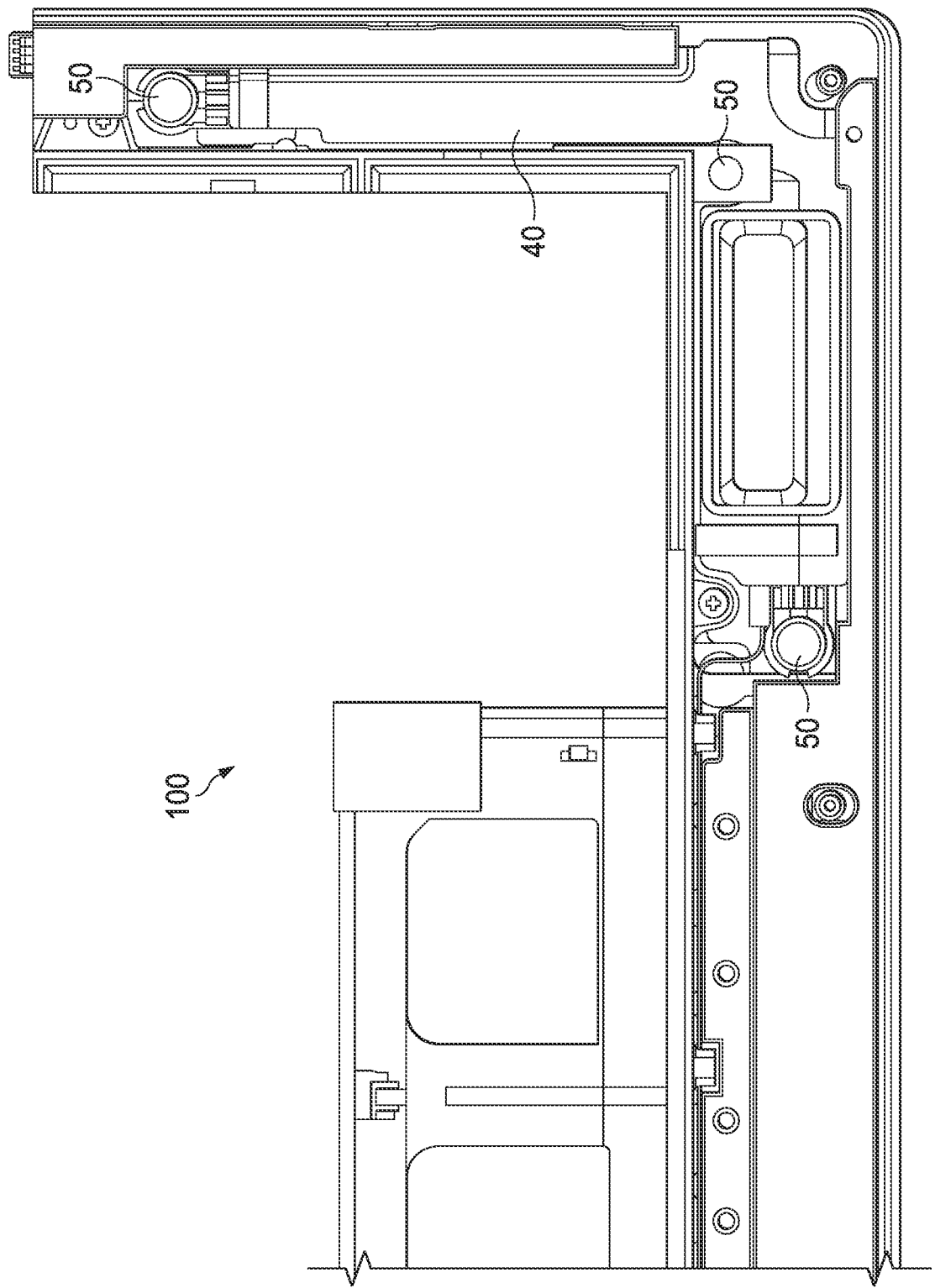
FIG. 18 shows an example of a portable computing device according to embodiments of the disclosure in which three pieces of elastic spacers are added on screw heads in a grommet area.

FIG. 18 shows an example of a portable computing device 100 according to embodiments of the disclosure in which three pieces of elastic spacers 50 are added on screw heads in area B (grommet area) for supporting. As noted above, these elastic spacers 50 have a convex shape (e.g., dome shape) and are pre-compressed. Precompression may be by 0.12 mm to 0.15 mm in absolute numbers, compared to compression-free sizes. As the elastic spacers 50 are convex-shaped, the compressing area (i.e., the area of contact under pre-compression) is small compared to the total area of the elastic spacers 50.

Figure 19:
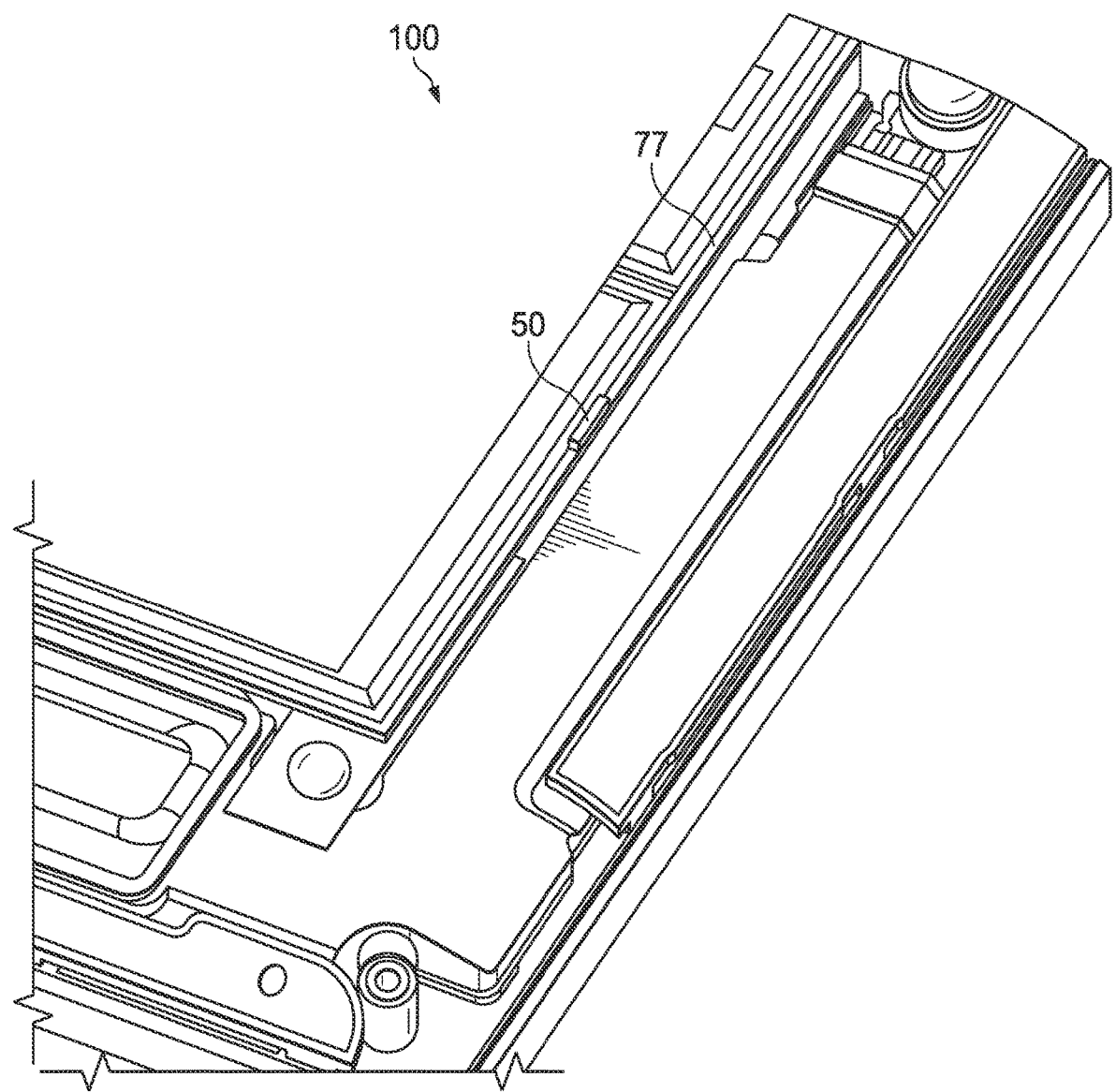
FIG. 19 shows an example of a portable computing device according to embodiments of the disclosure in which an elastic spacer is added on a battery frame.

FIG. 19 shows an example of a portable computing device 100 according to embodiments of the disclosure in which an elastic spacer 50 made from Poron® or other soft damping material is added to the battery frame 77 in area A (area between grommet areas). For a total height of T=0.5 mm, pre-compression may be by an amount of 0.25 mm in this example.

Figure 21:
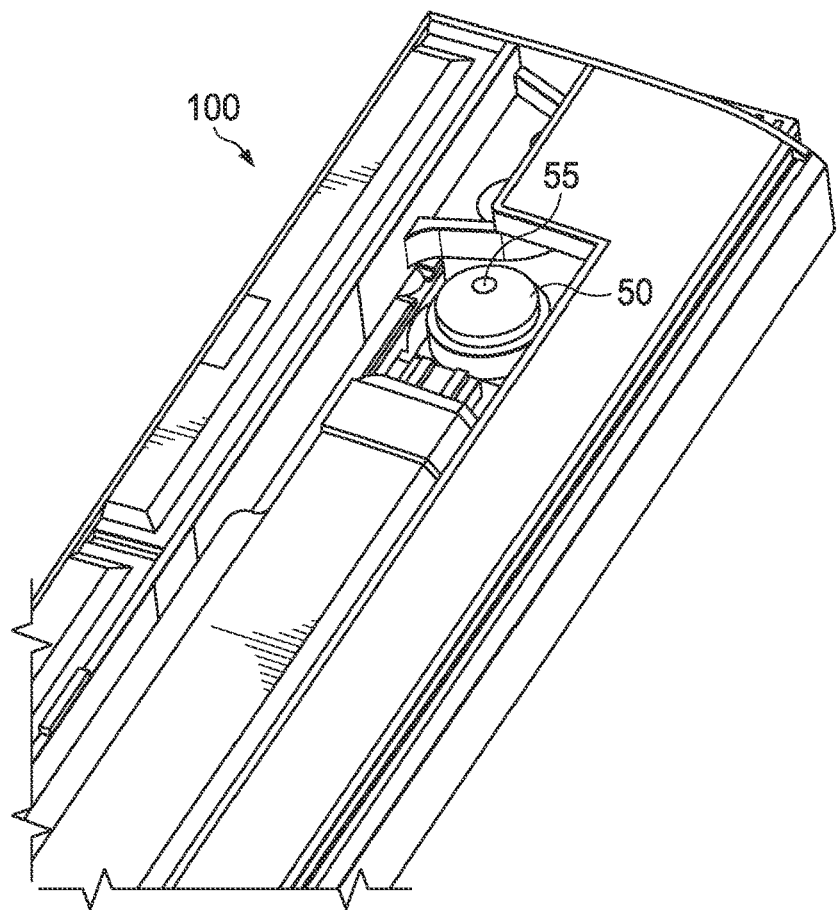

FIG. 20 shows a sectional view of an example of a portable computing device 100 according to embodiments of the disclosure in which an elastic spacer 50 is arranged at a screw head of a screw engaged with a screw boss. The screw boss may act as grommet fixation for grommet 60. The grommet 60 may be formed from pressure sensitive adhesive (PSA) and may have a thickness of 0.05 mm to 0.1 mm, for example. The elastic spacer 50 may be pre-compressed by, for example, 0.12 mm to 0.15 mm. The area of contact 55 of the convex-shaped (e.g., dome-shaped) elastic spacer 50 with the cover part opposite the screw head is small under pre-compression compared to the total area of the elastic spacer 50. This is also shown in FIG. 21, which is another view of the portable computing device 100 with the cover part opposite the screw head made transparent.

While embodiments and implementations relating to portable computing devices have been described above, it is understood that the present disclosure likewise relates to methods of improving frequency response of speakers in such portable computing devices.

FIG. 22 is a flowchart illustrating a method 300 of improving frequency response of a speaker in a portable computing device. Specifically, the frequency response may be improved in a bass range (e.g., between 200 Hz and 600 Hz). The portable computing device may be configured as described above. Method 300 comprises a step S310 of arranging one or more elastic spacers between the first cover part and the second cover part. As described above, the one or more elastic spacers may be arranged to counteract, by their elastic recoil forces, a compression of the speaker volume when the first and second cover parts are under external compressing forces. Further, as described above, the one or more elastic spacers may be arranged between the first and second cover parts to be partially compressed by the first and second cover parts in the absence of external compressing forces on the first and second cover parts.

Placement, shape, operation, etc. of the one or more elastic spacers in method 300 may be the same as described above for the portable computing device 100, for example.

Figure 23:
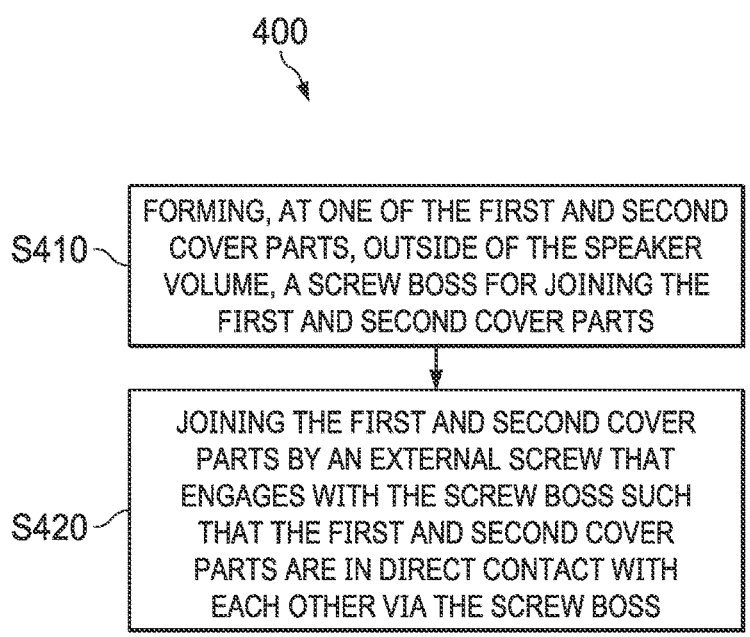
FIG. 23 is a flowchart illustrating an example of another method of improving frequency response of a speaker in a portable computing device according to embodiments of the disclosure.

FIG. 23 is a flowchart illustrating another method 400 of improving frequency response of a speaker in a portable computing device. The portable computing device may be configured as described above. Method 400 comprises steps S410 and S420.

At step S410, a screw boss for joining the first and second cover parts is formed at one of the first and second cover parts, outside of the speaker volume. This screw boss may act as grommet fixation.

At step S420, the first and second cover parts are joined by an external screw that engages with the screw boss such that the first and second cover parts are in direct contact with each other via the screw boss.

It is understood that specific numbers given throughout the disclosure, e.g., X mm, are provided as example design targets. In various implementations, the numbers can be adjusted for differently sized computing devices, different speakers, and/or different materials. For example, tolerances can be set to ±x % (e.g., 10%) to adjust for materials with different rigidity and/or covers with different thickness.

It is further understood that the portable computing device described throughout the disclosure can be a laptop computer, a tablet computer, a smart phone, a wearable device, a smart media player, or any (small and/or smart) device that includes a module of a loudspeaker or module of another form of transducer, e.g., a surface transducer.

Various aspects and implementations of the present disclosure may also be appreciated from the following enumerated example embodiments (EEEs), which are not claims.

EEE1. A method of improving frequency response in bass range for a speaker in a portable computing device, the method comprising:
placing one or more dome-shaped spacers at grommet areas connecting a relatively concave C cover and a relatively flat D cover of the computing device, the one or more dome-shaped spacers being compressed by a given amount; and
placing one or more elastic spacers in the computing device between the grommet areas, the elastic spacers being compressed and providing support for maintaining distance between the C cover and the D cover,
wherein the one or more dome-shaped spacers and the one or more elastic spacers are operable to maintain a size of a speaker box between the C cover and the D cover in which the speaker is located, when the C cover and D cover are under compressing forces.

EEE2. The method of EEE1, wherein the bass range is between 200 and 600 Hz.

EEE3. The method of any of EEE1 or EEE2, wherein the given amount is 0.12 to 0.15 mm.

EEE4. A system including:
a speaker; and
a portable computing device in which the speaker is located, wherein:
one or more dome-shaped spacers are placed at grommet areas connecting a relatively concave C cover and a relatively flat D cover of the computing device, the one or more dome-shaped spacers being compressed by a given amount,
one or more elastic spacers are placed in the computing device between the grommet areas, the elastic spacers being compressed and providing support for maintaining distance between the C cover and the D cover, and
the one or more dome-shaped spacers and the one or more elastic spacers are operable to maintain a size of a speaker box between the C cover and the D cover in which the speaker is located, when the C cover and D cover are under compressing forces.

EEE5. The system of EEE4, wherein the given amount is 0.12 to 0.15 mm.

We claim the following:

1. A method of improving frequency response of a speaker in a portable computing device comprising a first cover part, a second cover part, and a speaker arranged within a speaker volume, wherein the first and second cover parts are joined together to form a casing of the portable computing device, and wherein the speaker volume is formed between a portion of the first cover part and a portion of the second cover part, the method comprising:
arranging one or more elastic spacers between the first cover part and the second cover part,
wherein the one or more elastic spacers are arranged to counteract, by their elastic recoil forces, a compression of the speaker volume when the first and second cover parts are under external compressing forces; and
wherein the one or more elastic spacers are arranged between the first and second cover parts to be partially compressed by the first and second cover parts in the absence of external compressing forces on the first and second cover parts,
wherein the one or more elastic spacers have a convex shape on at least one of a first side facing the first cover part and a second side facing the second cover part.

2. The method according to claim 1, wherein the one or more elastic spacers are dome-shaped on the at least one of the first side and the second side.

3. A method of improving frequency response of a speaker in a portable computing device comprising a first cover part, a second cover part, and a speaker arranged within a speaker volume, wherein the first and second cover parts are joined together to form a casing of the portable computing device, and wherein the speaker volume is formed between a portion of the first cover part and a portion of the second cover part, the method comprising:

arranging one or more elastic spacers between the first cover part and the second cover part, wherein the one or more elastic spacers are arranged to counteract, by their elastic recoil forces, a compression of the speaker volume when the first and second cover parts are under external compressing forces; and wherein the one or more elastic spacers are arranged between the first and second cover parts to be partially compressed by the first and second cover parts in the absence of external compressing forces on the first and second cover parts, wherein the one or more elastic spacers are shaped such that an area of contact with at least one of the first cover part and the second cover part increases when the one or more elastic spacers are compressed by the first and second cover parts in a presence of the external compressing forces on the first and second cover parts, and wherein the one or more elastic spacers are arranged outside of the speaker volume.

4. The method according to claim 3, wherein the one or more elastic spacers are partially compressed by the first and second cover parts in the absence of external compressing forces on the first and second cover parts by 0.12 mm to 0.15 mm compared to their compression-free sizes.

5. The method according to claim 3, wherein the one or more elastic spacers are arranged to counteract, by their elastic recoil forces, a reduction of a clearance between said portion of the first cover part and said portion of the second cover part when the first and second cover parts are under external compressing forces.

6. The method according to claim 3, wherein the one or more elastic spacers are arranged to counteract, by their elastic recoil forces, a reduction of a clearance between said portion of the first cover part and the speaker, and/or between said portion of the second cover part and the speaker, when the first and second cover parts are under external compressing forces.

7. The method according to claim 3, wherein the one or more elastic spacers are arranged at respective support features formed at one of the first and second cover parts.

8. The method according to claim 3, wherein the one or more elastic spacers are arranged in grommet areas connecting the first and second cover parts.

9. The method according to claim 3, wherein the one or more elastic spacers are arranged at end surfaces of respective boss bars that act as grommet fixation.

10. The method according to claim 3, wherein the one or more elastic spacers are arranged at end surfaces of respective screw bosses for joining the first and second cover parts or at screw heads of screws engaged with said screw bosses.

11. The method according to claim 10, wherein the screw bosses act as grommet fixation.

12. The method according to claim 3, wherein the one or more elastic spacers are arranged at end surfaces of respective base pins that act as grommet fixation.

13. The method according to claim 3, wherein the one or more elastic spacers are arranged between grommet areas connecting the first and second cover parts.

14. The method according to claim 3, wherein the one or more elastic spacers are arranged at a battery frame of the portable computing device.

* * * * *